US012789705B2

(12) United States Patent
Chan et al.

(10) Patent No.: US 12,789,705 B2
(45) Date of Patent: Nov. 10, 2026

(54) VEHICLE CAMERA AND LIGHT PROJECTION SYSTEMS

(71) Applicant: Oshkosh Corporation, Oshkosh, WI (US)

(72) Inventors: Brendan Chan, Oshkosh, WI (US); Greg Steffens, Oshkosh, WI (US); Amanda Miller, Oshkosh, WI (US); Jeff Verhagen, Oshkosh, WI (US); Jon Branson, Oshkosh, WI (US); Mitchell Murphy, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 702 days.

(21) Appl. No.: 18/171,129

(22) Filed: Feb. 17, 2023

(65) Prior Publication Data

US 2023/0311768 A1 Oct. 5, 2023

Related U.S. Application Data

(60) Provisional application No. 63/325,661, filed on Mar. 31, 2022.

(51) Int. Cl.
*B60R 1/23* (2022.01)
*B60R 11/04* (2006.01)
(Continued)

(52) U.S. Cl.
CPC ................ *B60R 1/23* (2022.01); *B60R 11/04* (2013.01); *B65F 3/0213* (2013.01); *B65F 3/04* (2013.01);
(Continued)

(58) Field of Classification Search
CPC ....... B60R 1/23; B60R 11/04; B60R 2300/80; G06V 20/56; B65F 3/0213; B65F 2003/0269; B65F 2003/0279
See application file for complete search history.

(56) References Cited

U.S. PATENT DOCUMENTS 8,564,502 B2 * 10/2013 Cui ....................... G01S 13/723 345/7
8,629,903 B2 * 1/2014 Seder ..................... G02B 27/01 348/113
(Continued)

OTHER PUBLICATIONS https://info.macktrucks.com/refuse-revolution; "Welcome to the refuse revolution. Mack LR Electric." Retrieved on Mar. 21, 2023.
(Continued)

*Primary Examiner* — Saul Rodriguez
*Assistant Examiner* — Ashley K Romano
(74) *Attorney, Agent, or Firm* — Foley & Lardner LLP

(57) ABSTRACT

A refuse vehicle including a chassis, a tractive element coupled to the chassis and configured to engage a support surface to support the refuse vehicle, a refuse compartment coupled to the chassis, a lift assembly coupled to the chassis and configured to lift a refuse container to transfer refuse from the refuse container into the refuse compartment, and a light projector coupled to the chassis and positioned to emit a light onto the support surface to define a target area. The target area represents a range of positions within which the lift assembly is capable of engaging the refuse container.

18 Claims, 24 Drawing Sheets

(51) Int. Cl.
*B65F 3/02* (2006.01)
*B65F 3/04* (2006.01)
*G06V 20/56* (2022.01)

(52) U.S. Cl.
CPC .......... *G06V 20/56* (2022.01); *B60R 2300/80* (2013.01); *B65F 2003/0269* (2013.01); *B65F 2003/0279* (2013.01)

(56) References Cited

U.S. PATENT DOCUMENTS

| | | | | |
|---|---|---|---|---|
| 8,912,978 | B2 * | 12/2014 | Szczerba | G06V 10/806 701/1 |
| 9,992,465 | B1 * | 6/2018 | Schreiber | H04N 9/3194 |
| 11,434,681 | B2 * | 9/2022 | Rocholl | B65F 3/04 |
| 12,169,256 | B2 * | 12/2024 | Valois | G01S 17/08 |
| 2004/0002794 | A1 | 1/2004 | Pillar et al. | |
| 2005/0113996 | A1 | 5/2005 | Pillar et al. | |
| 2005/0234622 | A1 | 10/2005 | Pillar et al. | |
| 2008/0114513 | A1 | 5/2008 | Pillar et al. | |
| 2015/0210313 | A1 | 7/2015 | Sears et al. | |
| 2019/0276102 | A1 | 9/2019 | Zuleger et al. | |
| 2020/0180645 | A1 * | 6/2020 | Itoh | B60K 35/28 |
| 2020/0290237 | A1 | 9/2020 | Steffens et al. | |
| 2020/0291846 | A1 | 9/2020 | Steffens et al. | |
| 2021/0121340 | A1 | 4/2021 | Malcolm et al. | |
| 2021/0138999 | A1 * | 5/2021 | Thomas | G06V 20/59 |
| 2021/0171137 | A1 | 6/2021 | Zuleger et al. | |
| 2021/0276423 | A1 | 9/2021 | Lombardo et al. | |
| 2021/0276847 | A1 | 9/2021 | Neubauer et al. | |
| 2021/0276848 | A1 | 9/2021 | Miller et al. | |
| 2021/0292086 | A1 | 9/2021 | Mahan et al. | |
| 2021/0323763 | A1 | 10/2021 | Koga et al. | |
| 2021/0323764 | A1 | 10/2021 | Koga et al. | |
| 2021/0323765 | A1 | 10/2021 | Koga et al. | |
| 2021/0325529 | A1 | 10/2021 | Koga et al. | |
| 2021/0325911 | A1 | 10/2021 | Koga et al. | |
| 2021/0345062 | A1 | 11/2021 | Koga et al. | |
| 2021/0369515 | A1 | 12/2021 | Malcolm et al. | |
| 2021/0373560 | A1 | 12/2021 | Koga et al. | |
| 2022/0000686 | A1 | 1/2022 | Malcolm et al. | |
| 2022/0033181 | A1 | 2/2022 | Koga et al. | |
| 2022/0072736 | A1 | 3/2022 | Steffens et al. | |
| 2022/0097527 | A1 | 3/2022 | Koga et al. | |
| 2022/0097961 | A1 | 3/2022 | Koga et al. | |
| 2022/0097964 | A1 | 3/2022 | Koga et al. | |
| 2022/0118854 | A1 | 4/2022 | Davis et al. | |
| 2022/0135385 | A1 | 5/2022 | Lombardo et al. | |
| 2022/0185582 | A1 | 6/2022 | Koga et al. | |
| 2022/0204332 | A1 | 6/2022 | Miller et al. | |
| 2022/0211560 | A1 | 7/2022 | Malcolm et al. | |
| 2022/0234873 | A1 | 7/2022 | Miller et al. | |
| 2023/0002152 | A1 | 1/2023 | Koga et al. | |

OTHER PUBLICATIONS https://www.youtube.com/watch?v=NQFtAnm7D-c; "All-New Mack LR Electric Garbage Truck." Retrieved on Mar. 21, 2023.

* cited by examiner

VEHICLE CAMERA AND LIGHT PROJECTION SYSTEMS

CROSS-REFERENCE TO RELATED PATENT APPLICATIONS

This application claims the benefit of and priority to U.S. Provisional Application No. 63/325,661, filed on Mar. 31, 2022, the entire disclosure of which is hereby incorporated by reference herein.

BACKGROUND

The present disclosure relates generally to vehicles. More specifically, the present disclosure relates to alignment systems and methods that can help a user position a vehicle, such as a refuse vehicle, relative to another object (e.g., a refuse can, etc.) using visual cues.

SUMMARY

One implementation of the present disclosure is a refuse vehicle including a chassis, a tractive element coupled to the chassis and configured to engage a support surface to support the refuse vehicle, a refuse compartment coupled to the chassis, a lift assembly coupled to the chassis and configured to lift a refuse container to transfer refuse from the refuse container into the refuse compartment, and a light projector coupled to the chassis and positioned to emit a light onto the support surface to define a target area. In some embodiments the target area represents a range of positions within which the lift assembly is capable of engaging the refuse container.

In some embodiments the refuse vehicle uses the light projector to define at least one boundary of the target area. In other embodiments, the light from the light projector extends within the target area.

In some embodiments, the refuse vehicle includes a sensor that detects a position of the refuse container relative to the target area. In some embodiments, the refuse vehicle has a first controller that varies a parameter of the light based on a sensor data. In some embodiments, the parameter of the light is a wavelength of the light which can be set to at least a first value, a second value, or a third value. In some embodiments, the first controller sets the parameter of the light to the first value when the refuse container is positioned outside of the target area, the second value when the refuse container is partially within the target area, and the third value when the refuse container is within the target area.

In some embodiments, the refuse vehicle is a front-loading refuse vehicle, and the lift assembly includes a fork that engages the refuse container. In yet another embodiment, the refuse vehicle is a side-loading refuse vehicle, and the lift assembly includes a grabber that engages the refuse container.

In some embodiments, the refuse vehicle includes a camera to show the target area, a display, and a second controller operatively coupled to the display and the camera and configured to display on the display an image data received from the camera with a visual indicator showing the target area.

Another implementation of the present disclosure is a refuse vehicle including a chassis, a tractive element coupled to the chassis and configured to engage a support surface to support the refuse vehicle, a refuse compartment coupled to the chassis, a lift assembly coupled to the chassis and configured to lift a refuse container to transfer refuse from the refuse container into the refuse compartment. In some embodiments, the lift assembly has a target area within which the lift assembly is capable of engaging the refuse container. In some embodiments, the refuse vehicle includes a display, a camera coupled to the chassis and configured to provide an image data representing at least a portion of the target area, and a controller operatively coupled to the display and the camera and configured to receive the image data from the camera and to display the image data and an overlay representing the target area on the display.

In some embodiments, the controller is configured to display the image data and the overlay when the refuse vehicle reaches a threshold speed.

In some embodiments, the refuse vehicle includes a light projector coupled to the chassis and positioned to emit a light having a wavelength onto the support surface to define the target area. In some embodiments, the wavelength is outside the visible spectrum. In some embodiments, the camera is configured to detect the wavelength and the controller is configured to display the light onto the display such that an operator of the refuse vehicle can view the light.

Another implementation of the present disclosure relates to a vehicle which includes a chassis, a tractive element coupled to the chassis and configured to engage a support surface to support the vehicle, a body coupled to the chassis, an implement coupled to the chassis, an actuator coupled to the implement and configured to move the implement between an extended position and a retracted position. In some embodiments, the implement extends farther from the body in the extended position than in the retracted position. In some embodiments, the vehicle includes a light projector coupled to the chassis and positioned to emit light onto the support surface to define a warning area. In some embodiments, the warning area is positioned below the implement's extended position.

In some embodiments, the vehicle is a refuse vehicle, and the implement is a lift assembly. In other embodiments, the vehicle is a refuse vehicle, and the implement is a tailgate. In another embodiment, the vehicle is at least one of a firetruck or a lift device, and the implement is an outrigger. In some embodiments, the light forms text on the support surface.

Another implementation of the present disclosure relates to a vehicle. The vehicle includes a chassis, a vehicle body supported by the chassis, and a projector. The projector is positioned to emit light outwardly away from the refuse vehicle and proximate the lift assembly to define a target area. The target area corresponds with an area below which a dynamic component (e.g., a tailgate) on the vehicle moves.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
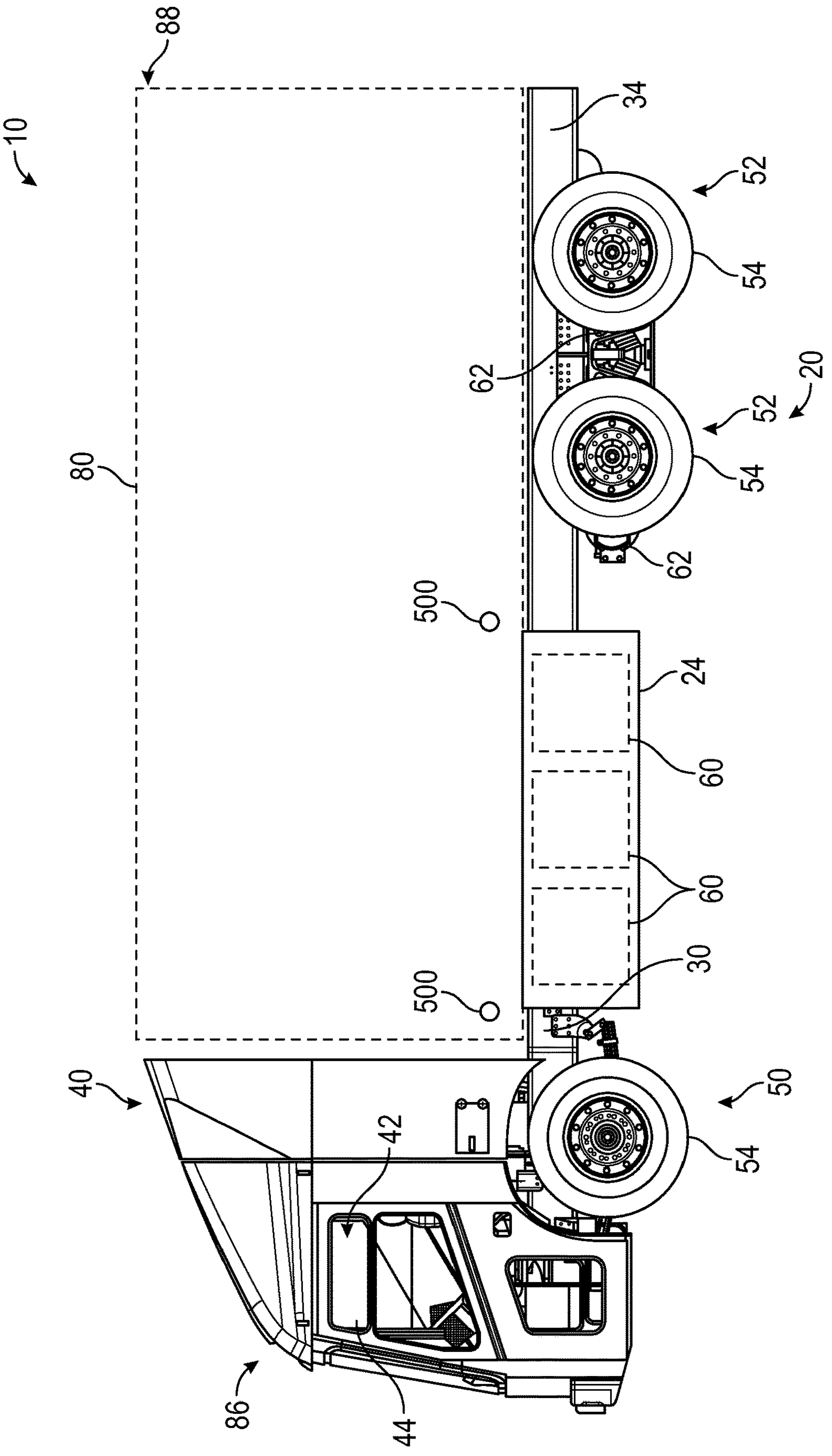
FIG. 1 is a left-side view of a vehicle, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes an alignment system of projectors and sensors that are used to operate and control a vehicle. The alignment systems can use a combination of lighting and cameras to identify target areas or operational envelopes that can provide information to users to help operate the vehicle and navigate through various areas during operation. In some examples, the combination of lighting, camera systems, and sensors can be used to operate the vehicle autonomously or semi-autonomously. Operators using traditional refuse vehicles lose time maneuvering the refuse vehicle relative to the waste container or vice versa by either visually attempting to align the refuse vehicle relative to the waste container (often with an imperfect line of sight) or by exiting the cab of the refuse vehicle to physically adjust the position of the waste container relative to the refuse vehicle so that the lifting system can properly engage the waste container. The time, money, and efficiency lost by improperly positioning the refuse vehicle relative to waste containers is avoided by the refuse vehicles according to the disclosure by incorporating different types of vehicle positioning systems. In some examples, the lighting and alignments systems are further configured to provide information to users outside the vehicle that will help perform tasks and avoid areas where the vehicle may be operating (e.g., the lifting system, tailgate, etc.).

The vehicles shown in the FIGURES are equipped with one or more projectors (e.g., lighting assembly) that emit light downwardly and outwardly away from the refuse vehicle. The emitted light defines a target area or target zone that corresponds to a range of locations relative to the lifting system of the refuse vehicle where a waste container should be placed before engagement. If the waste container is positioned within the target area, the lifting system on the refuse vehicle can theoretically engage, lift, and empty the waste container without needing additional relative movement (e.g., lateral movement, fore-aft movement) between the refuse vehicle and the waste container. The light emitted from the projector can be visible light (e.g., within the visible spectrum) so that an operator can readily see the target area from within the cab of the refuse vehicle and can stop the refuse vehicle when a waste container is visually confirmed to be positioned within the target area, either externally or using a display within a cab of the vehicle. In some examples, the cab of the refuse vehicle can be equipped with a display that presents visual data from a camera positioned proximate the projector. The camera monitors a field of view, which includes the target area, and presents the data received from the camera onto the display. Using the display, the operator within the cab of the refuse vehicle can reposition the refuse vehicle until the display shows the waste container is present within the target area. Once the waste container is positioned within the target area, the operator can initiate a collection sequence by moving the lifting system to engage and lift the waste container so that the contents can be emptied into the on-board receptacle. By removing the guesswork and subsequent correction normally involved in aligning the refuse vehicle relative to the waste container, the process of collecting waste during a route is streamlined. Significant cost savings are realized by maximizing the amount of time that an operator spends within the cab of the refuse vehicle and limiting time spent outside the cab moving waste containers. Both goals are accomplished by the vehicle positioning systems disclosed herein.

The vehicles shown in the FIGURES are further configured to emit light downwardly and outwardly away from the refuse vehicle, to illuminate working areas that should be avoided by workers. The emitted light defines an operational envelope of the vehicle, which should be avoided by passersby and operators. The various operational envelopes illuminated can include an area in which a grabber mechanism will operate, an area above which a tailgate will move, an area in which outriggers will project, and other locations that are preferably avoided by operators and passersby.

Overall Vehicle

Figure 2:
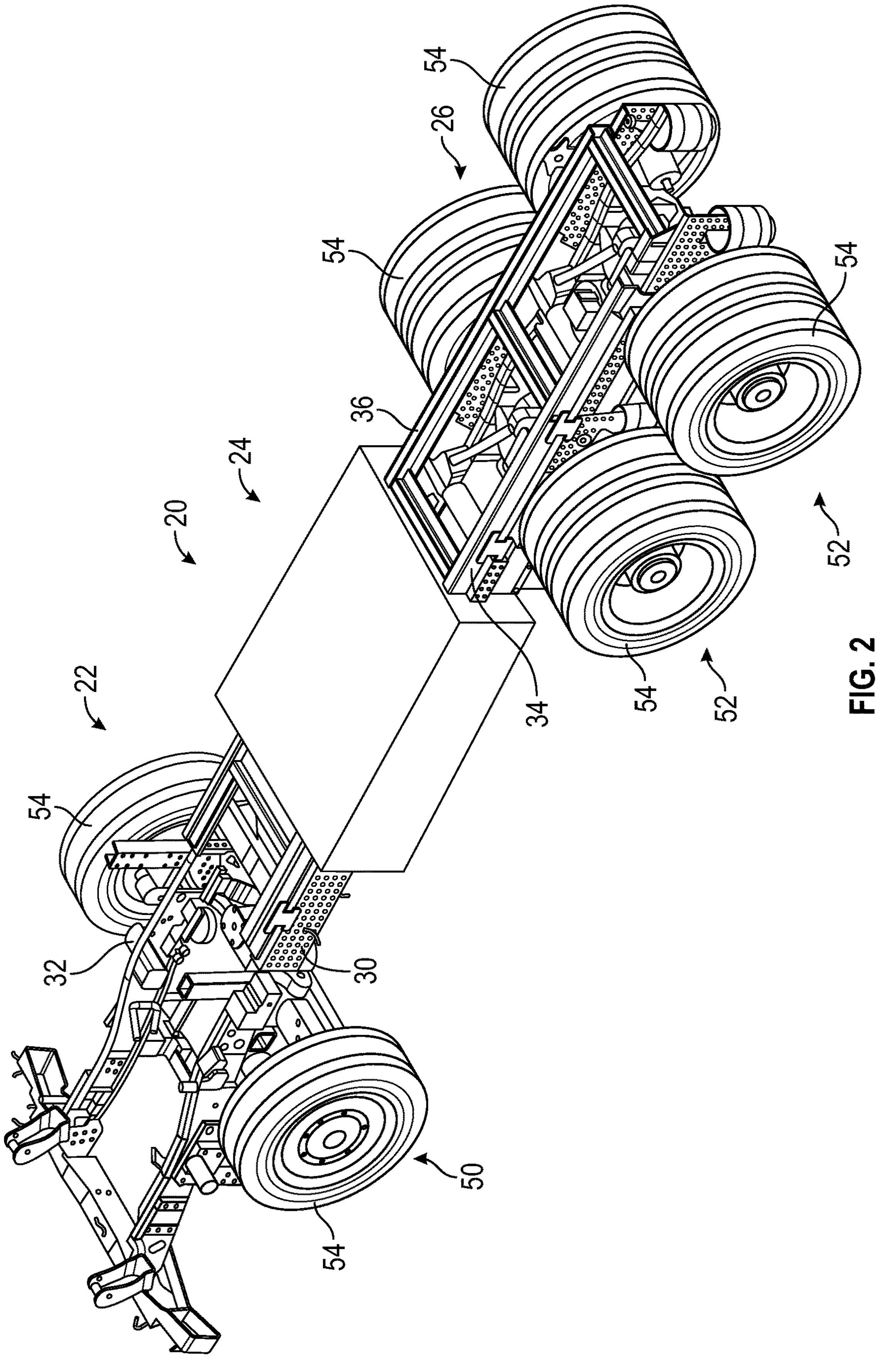
FIG. 2 is a perspective view of a chassis of the vehicle of FIG. 1.

Referring to FIGS. 1 and 2, a reconfigurable vehicle (e.g., a vehicle assembly, a truck, a vehicle base, etc.) is shown as vehicle 10, according to an exemplary embodiment. As shown, the vehicle 10 includes a frame assembly or chassis assembly, shown as chassis 20, that supports other components of the vehicle 10. The chassis 20 extends longitudinally along a length of the vehicle 10, substantially parallel to a primary direction of travel of the vehicle 10. As shown, the chassis 20 includes three sections or portions, shown as front section 22, middle section 24, and rear section 26. The middle section 24 of the chassis 20 extends between the front section 22 and the rear section 26. In some embodiments, the middle section 24 of the chassis 20 couples the front section 22 to the rear section 26. In other embodiments, the front section 22 is coupled to the rear section 26 by another component (e.g., the body of the vehicle 10).

As shown in FIG. 2, the front section 22 includes a pair of frame portions, frame members, or frame rails, shown as front rail portion 30 and front rail portion 32. The rear section 26 includes a pair of frame portions, frame members, or frame rails, shown as rear rail portion 34 and rear rail portion 36. The front rail portion 30 is laterally offset from the front rail portion 32. Similarly, the rear rail portion 34 is laterally offset from the rear rail portion 36. This spacing may provide frame stiffness and space for vehicle components (e.g., batteries, motors, axles, gears, etc.) between the frame rails. In some embodiments, the front rail portions 30 and 32 and the rear rail portions 34 and 36 extend longitudinally and substantially parallel to one another. The chassis 20 may include additional structural elements (e.g., cross members that extend between and couple the frame rails).

In some embodiments, the front section 22 and the rear section 26 are configured as separate, discrete subframes (e.g., a front subframe and a rear subframe). In such embodiments, the front rail portion 30, the front rail portion 32, the rear rail portion 34, and the rear rail portion 36 are separate, discrete frame rails that are spaced apart from one another. In some embodiments, the front section 22 and the rear section 26 are each directly coupled to the middle section 24 such that the middle section 24 couples the front section 22 to the rear section 26. Accordingly, the middle section 24 may include a structural housing or frame. In other embodiments, the front section 22, the middle section 24, and the rear section 26 are coupled to one another by another component, such as a body of the vehicle 10.

In other embodiments, the front section 22, the middle section 24, and the rear section 26 are defined by a pair of frame rails that extend continuously along the entire length of the vehicle 10. In such an embodiment, the front rail portion 30 and the rear rail portion 34 would be front and rear portions of a first frame rail, and the front rail portion 32 and the rear rail portion 36 would be front and rear portions of a second frame rail. In such embodiments, the middle section 24 would include a center portion of each frame rail.

In some embodiments, the middle section 24 acts as a storage portion that includes one or more vehicle components. The middle section 24 may include an enclosure that contains one or more vehicle components and/or a frame that supports one or more vehicle components. By way of example, the middle section 24 may contain or include one or more electrical energy storage devices (e.g., batteries, capacitors, etc.). By way of another example, the middle section 24 may include fuel tanks. By way of yet another example, the middle section 24 may define a void space or storage volume that can be filled by a user.

A cabin, operator compartment, or body component, shown as cab 40, is coupled to a front-end portion of the chassis 20 (e.g., the front section 22 of the chassis 20). Together, the chassis 20 and the cab 40 define a front end of the vehicle 10. The cab 40 extends above the chassis 20. The cab 40 includes an enclosure or main body that defines an interior volume, shown as cab interior 42, that is sized to contain one or more operators. The cab 40 also includes one or more doors 44 that facilitate selective access to the cab interior 42 from outside of the vehicle 10. The cab interior 42 contains one or more components that facilitate operation of the vehicle 10 by the operator. By way of example, the cab interior 42 may contain components that facilitate operator comfort (e.g., seats, seatbelts, etc.), user interface components that receive inputs from the operators (e.g., steering wheels, pedals, touch screens, switches, buttons, levers, etc.), and/or user interface components that provide information to the operators (e.g., lights, gauges, speakers, etc.). The user interface components within the cab 40 may facilitate operator control over the drive components of the vehicle 10 and/or over any implements of the vehicle 10.

The vehicle 10 further includes a series of axle assemblies, shown as front axle 50 and rear axles 52. As shown, the vehicle 10 includes one front axle 50 coupled to the front section 22 of the chassis 20 and two rear axles 52 each coupled to the rear section 26 of the chassis 20. In other embodiments, the vehicle 10 includes more or fewer axles. By way of example, the vehicle 10 may include a tag axle that may be raised or lowered to accommodate variations in weight being carried by the vehicle 10. The front axle 50 and the rear axles 52 each include a series of tractive elements (e.g., wheels, treads, etc.), shown as wheel and tire assemblies 54. The wheel and tire assemblies 54 are configured to engage a support surface (e.g., roads, the ground, etc.) to support and propel the vehicle 10. The front axle 50 and the rear axles 52 may include steering components (e.g., steering arms, steering actuators, etc.), suspension components (e.g., gas springs, dampeners, air springs, etc.), power transmission or drive components (e.g., differentials, drive shafts, etc.), braking components (e.g., brake actuators, brake pads, brake discs, brake drums, etc.), and/or other components that facilitate propulsion or support of the vehicle.

In some embodiments, the vehicle 10 is configured as an electric vehicle that is propelled by an electric powertrain system. Referring to FIG. 1, the vehicle 10 includes one or more electrical energy storage devices (e.g., batteries, capacitors, etc.), shown as batteries 60. As shown, the batteries 60 are positioned within the middle section 24 of the chassis 20. In other embodiments, the batteries 60 are otherwise positioned throughout the vehicle 10. The vehicle 10 further includes one or more electromagnetic devices or prime movers (e.g., motor/generators), shown as drive motors 62. The drive motors 62 are electrically coupled to the batteries 60. The drive motors 62 may be configured to receive electrical energy from the batteries 60 and provide rotational mechanical energy to the wheel and tire assemblies 54 to propel the vehicle 10. The drive motors 62 may be configured to receive rotational mechanical energy from the wheel and tire assemblies 64 and provide electrical energy to the batteries 60, providing a braking force to slow the vehicle 10.

The batteries 60 may include one or more rechargeable batteries (e.g., lithium-ion batteries, nickel-metal hydride batteries, lithium-ion polymer batteries, lead-acid batteries, nickel-cadmium batteries, etc.). The batteries 60 may be charged by one or more sources of electrical energy onboard the vehicle 10 (e.g., solar panels, etc.) or separate from the vehicle 10 (e.g., connections to an electrical power grid, a wireless charging system, etc.). As shown, the drive motors 62 are positioned within the rear axles 52 (e.g., as part of a combined axle and motor assembly). In other embodiments, the drive motors 62 are otherwise positioned within the vehicle 10.

In other embodiments, the vehicle 10 is configured as a hybrid vehicle that is propelled by a hybrid powertrain system (e.g., a diesel/electric hybrid, gasoline/electric hybrid, natural gas/electric hybrid, etc.). According to an exemplary embodiment, the hybrid powertrain system may include a primary driver (e.g., an engine, a motor, etc.), an energy generation device (e.g., a generator, etc.), and/or an energy storage device (e.g., a battery, capacitors, ultra-capacitors, etc.) electrically coupled to the energy generation device. The primary driver may combust fuel (e.g., gasoline, diesel, etc.) to provide mechanical energy, which a transmission may receive and provide to the front axle 50 and/or the rear axles 52 to propel the vehicle 10. Additionally, or alternatively, the primary driver may provide mechanical energy to the generator, which converts the mechanical energy into electrical energy. The electrical energy may be stored in the energy storage device (e.g., the batteries 60) in order to later be provided to a motive driver.

In yet other embodiments, the chassis 20 may further be configured to support non-hybrid powertrains. For example, the powertrain system may include a primary driver that is a compression-ignition internal combustion engine that utilizes diesel fuel.

Referring to FIG. 1, the vehicle 10 includes a rear assembly, module, implement, body, or cargo area, shown as application kit 80. The application kit 80 may include one or more implements, vehicle bodies, and/or other components. Although the application kit 80 is shown positioned behind the cab 40, in other embodiments the application kit 80 extends forward of the cab 40. The vehicle 10 may be outfitted with a variety of different application kits 80 to configure the vehicle 10 for use in different applications. Accordingly, a common vehicle 10 can be configured for a variety of different uses simply by selecting an appropriate application kit 80. By way of example, the vehicle 10 may be configured as a refuse vehicle, a concrete mixer, a fire fighting vehicle, an airport fire fighting vehicle, a lift device (e.g., a boom lift, a scissor lift, a telehandler, a vertical lift, etc.), a crane, a tow truck, a military vehicle, a delivery vehicle, a mail vehicle, a boom truck, a plow truck, a farming machine or vehicle, a construction machine or vehicle, a coach bus, a school bus, a semi-truck, a passenger or work vehicle (e.g., a sedan, a SUV, a truck, a van, etc.), and/or still another vehicle. FIGS. 3-13 illustrate various examples of how the vehicle 10 may be configured for specific applications. Although only a certain set of vehicle configurations is shown, it should be understood that the vehicle 10 may be configured for use in other applications that are not shown.

The application kit 80 may include various actuators to facilitate certain functions of the vehicle 10. By way of example, the application kit 80 may include hydraulic actuators (e.g., hydraulic cylinders, hydraulic motors, etc.), pneumatic actuators (e.g., pneumatic cylinders, pneumatic motors, etc.), and/or electrical actuators (e.g., electric motors, electric linear actuators, etc.). The application kit 80 may include components that facilitate operation of and/or control of these actuators. By way of example, the application kit 80 may include hydraulic or pneumatic components that form a hydraulic or pneumatic circuit (e.g., conduits, valves, pumps, compressors, gauges, reservoirs, accumulators, etc.). By way of another example, the application kit 80 may include electrical components (e.g., batteries, capacitors, voltage regulators, motor controllers, etc.). The actuators may be powered by components of the vehicle 10. By way of example, the actuators may be powered by the batteries 60, the drive motors 62, or the primary driver (e.g., through a power take off).

The vehicle 10 generally extends longitudinally from a front side 86 to a rear side 88. The front side 86 is defined by the cab 40 and/or the chassis. The rear side 88 is defined by the application kit 80 and/or the chassis 20. The primary, forward direction of travel of the vehicle 10 is longitudinal, with the front side 86 being arranged forward of the rear side 88.

A. Front-Loading Refuse Vehicle

Figure 3:
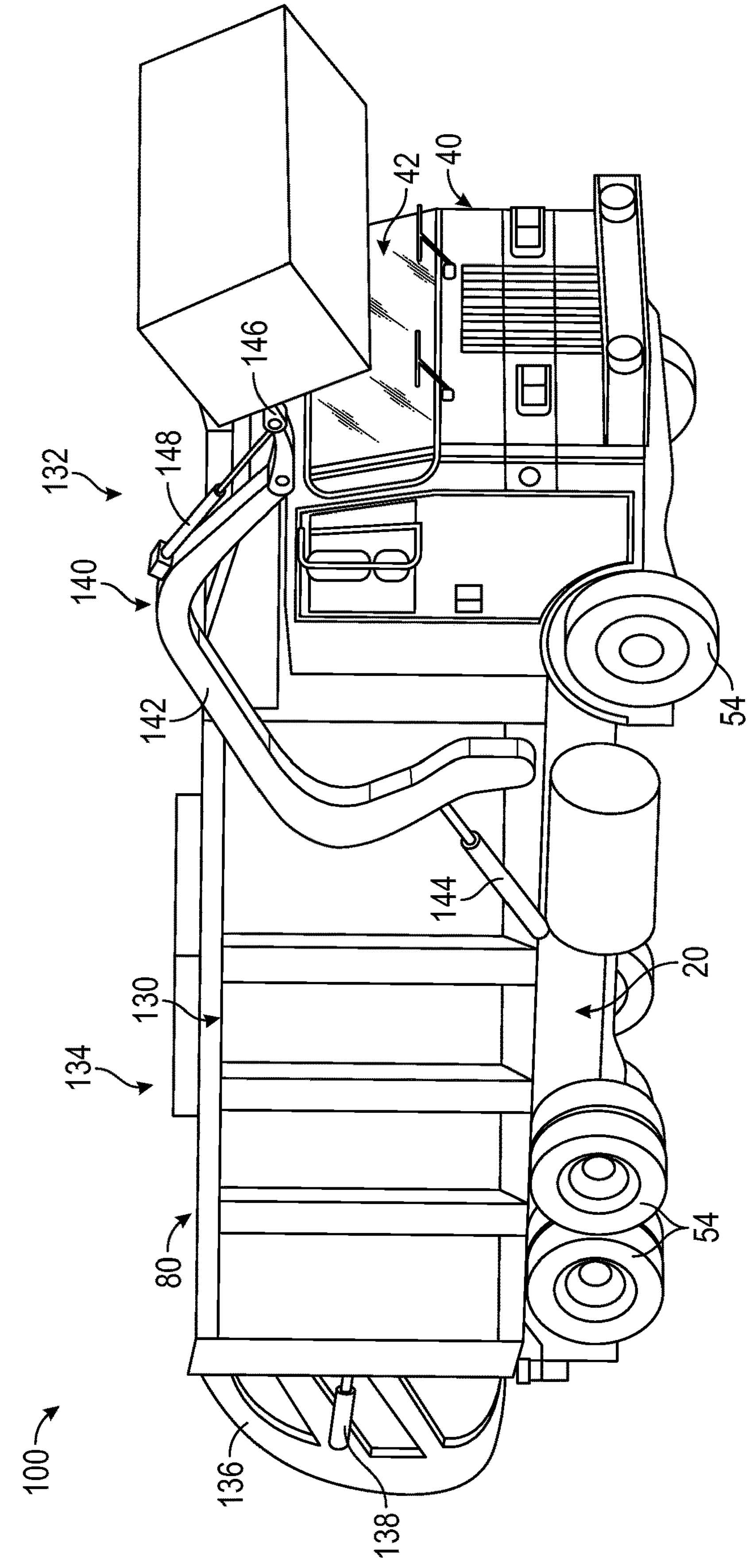
FIG. 3 is a perspective view of the vehicle of FIG. 1, configured as a front-loading refuse vehicle, according to an exemplary embodiment.
Figure 4:
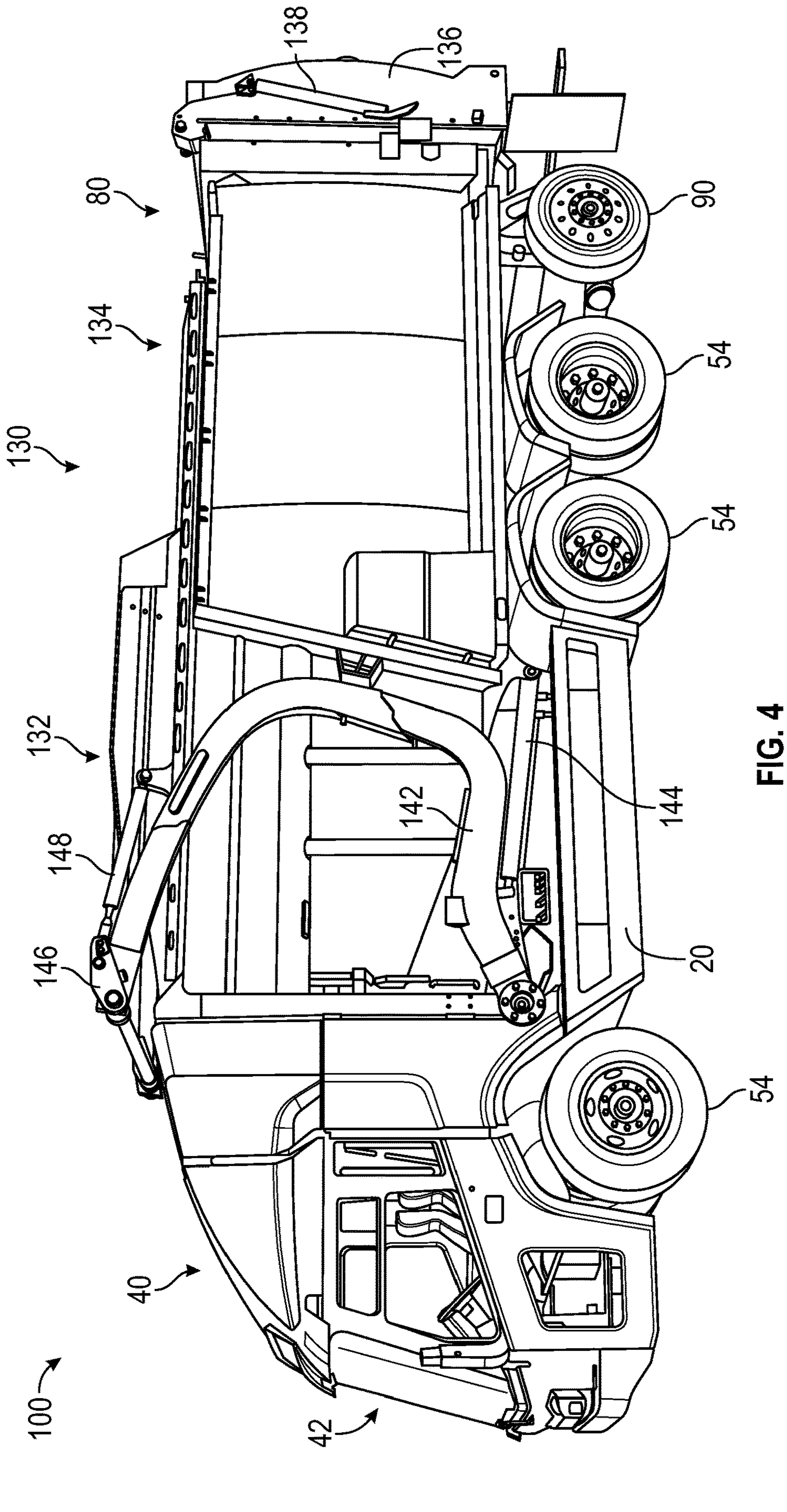
FIG. 4 is a left-side view of the front-loading refuse vehicle of FIG. 3 configured with a tag axle.
Figure 5:
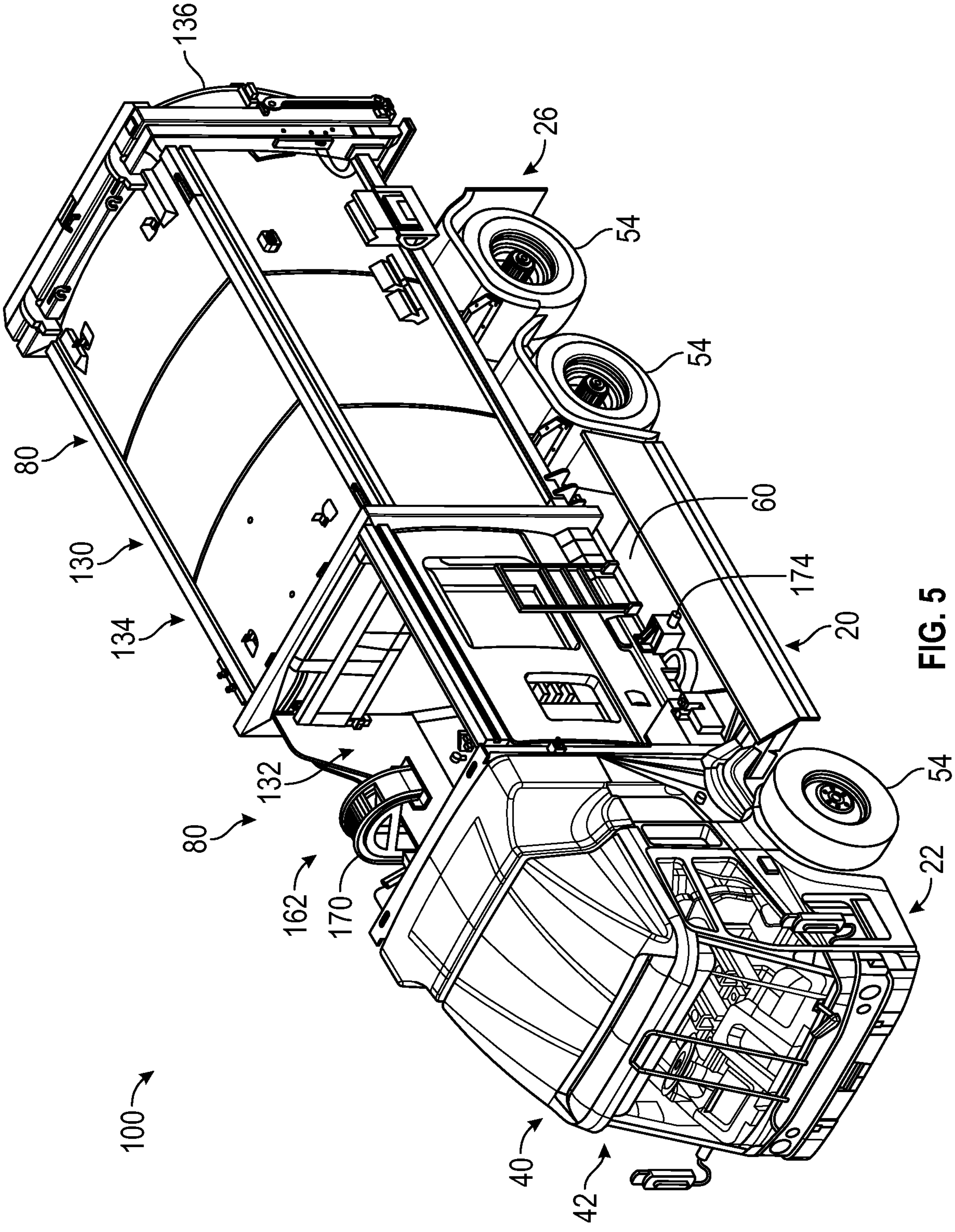
FIG. 5 is a perspective view of the vehicle of FIG. 1 configured as a side-loading refuse vehicle, according to an exemplary embodiment.

Referring now to FIGS. 3 and 4, the vehicle 10 is configured as a refuse vehicle 100 (e.g., a refuse truck, a garbage truck, a waste collection truck, a sanitation truck, a recycling truck, etc.). Specifically, the refuse vehicle 100 is a front-loading refuse vehicle. In other embodiments, the refuse vehicle 100 is configured as a rear-loading refuse vehicle or a front-loading refuse vehicle. The refuse vehicle 100 may be configured to transport refuse from various waste receptacles (e.g., refuse containers) within a municipality to a storage and/or processing facility (e.g., a landfill, an incineration facility, a recycling facility, etc.).

FIG. 4 illustrates the refuse vehicle 100 of FIG. 3 configured with a liftable axle, shown as tag axle 90, including a pair of wheel and tire assemblies 54. As shown, the tag axle 90 is positioned reward of the rear axles 52. The tag axle 90 can be selectively raised and lowered (e.g., by a hydraulic actuator) to selectively engage the wheel and tire assemblies 54 of the tag axle 90 with the ground. The tag axle 90 may be raised to reduce rolling resistance experienced by the refuse vehicle 100. The tag axle 90 may be lowered to distribute the loaded weight of the vehicle 100 across a greater number of a wheel and tire assemblies 54 (e.g., when the refuse vehicle 100 is loaded with refuse).

As shown in FIGS. 3 and 4, the application kit 80 of the refuse vehicle 100 includes a series of panels that form a rear body or container, shown as refuse compartment 130. The refuse compartment 130 may facilitate transporting refuse from various waste receptacles within a municipality to a storage and/or a processing facility (e.g., a landfill, an incineration facility, a recycling facility, etc.). By way of example, loose refuse may be placed into the refuse compartment 130 where it may be compacted (e.g., by a packer system within the refuse compartment 130). The refuse compartment 130 may also provide temporary storage for refuse during transport to a waste disposal site and/or a recycling facility. In some embodiments, the refuse compartment 130 may define a hopper volume 132 and storage volume 134. In this regard, refuse may be initially loaded into the hopper volume 132 and later compacted into the storage volume 134. As shown, the hopper volume 132 is positioned between the storage volume 134 and the cab 40 (e.g., refuse is loaded into a portion of the refuse compartment 130 behind the cab 40 and stored in a portion further toward the rear of the refuse compartment 130). In other embodiments, the storage volume may be positioned between the hopper volume and the cab 40 (e.g., in a rear-loading refuse truck, etc.). The application kit 80 of the refuse vehicle 100 further includes a pivotable rear portion, shown as tailgate 136, that is pivotally coupled to the refuse compartment 130. The tailgate 136 may be selectively repositionable between a closed position and an open position by an actuator (e.g., a hydraulic cylinder, an electric linear actuator, etc.), shown as tailgate actuator 138 (e.g., to facilitate emptying the storage volume).

As shown in FIGS. 3 and 4, the refuse vehicle 100 also includes an implement, shown as lift assembly 140, which is a front-loading lift assembly. According to an exemplary embodiment, the lift assembly 140 includes a pair of lift arms 142 and a pair of actuators (e.g., hydraulic cylinders, electric linear actuators, etc.), shown as lift arm actuators 144. The lift arms 142 may be rotatably coupled to the chassis 20 and/or the refuse compartment 130 on each side of the refuse vehicle 100 (e.g., through a pivot, a lug, a shaft, etc.), such that the lift assembly 140 may extend forward relative to the cab 40 (e.g., a front-loading refuse truck, etc.). In other embodiments, the lift assembly 140 may extend rearward relative to the application kit 80 (e.g., a rear-loading refuse truck). As shown in FIGS. 3 and 4, in an exemplary embodiment the lift arm actuators 144 may be positioned such that extension and retraction of the lift arm actuators 144 rotates the lift arms 142 about an axis extending through the pivot. In this regard, the lift arms 142 may be rotated by the lift arm actuators 144 to lift a refuse container over the cab 40. The lift assembly 140 further includes a pair of interface members, shown as lift forks 146, each pivotally coupled to a distal end of one of the lift arms 142. The lift forks 146 may be configured to engage a refuse container (e.g., a dumpster) to selectively couple the refuse container to the lift arms 142. By way of example, each of the lift forks 146 may be received within a corresponding pocket defined by the refuse container. A pair of actuators (e.g., hydraulic cylinders, electric linear actuators, etc.), shown as articulation actuators 148, are each coupled to one of the lift arms 142 and one of the lift forks 146. The articulation actuators 148 may be positioned to rotate the lift forks 146 relative to the lift arms 142 about a horizontal axis. Accordingly, the articulation actuators 148 may assist in tipping refuse out of the refuse container and into the refuse compartment 130. The lift arm actuators 144 may then rotate the lift arms 142 to return the empty refuse container to the ground.

B. Side-Loading Refuse Vehicle

Figure 8:
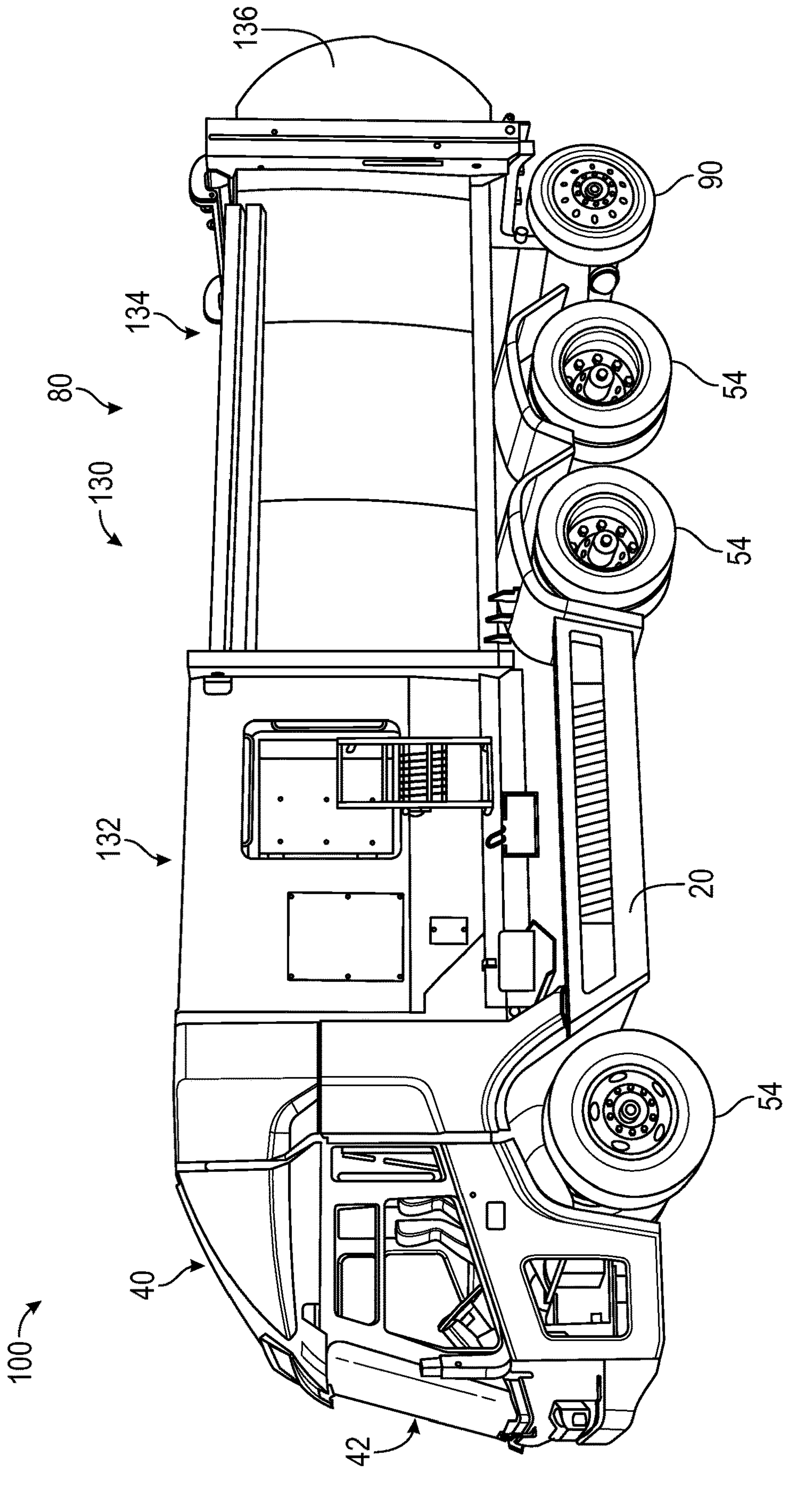
FIG. 8 is a left-side view of the side-loading refuse vehicle of FIG. 5 configured with a tag axle.

Referring now to FIGS. 5-8, an alternative configuration of the refuse vehicle 100 is shown according to an exemplary embodiment. Specifically, the refuse vehicle 100 of FIGS. 5-8 is configured as a side-loading refuse vehicle. The refuse vehicle 100 of FIGS. 5-8 may be substantially similar to the front-loading refuse vehicle 100 of FIGS. 3 and 4 except as otherwise specified herein. As shown in FIG. 8, the refuse vehicle 100 of FIGS. 5-7 may be configured with a tag axle 90.

Referring still to FIGS. 5-8, the refuse vehicle 100 omits the lift assembly 140 and instead includes a side-loading lift assembly, shown as lift assembly 160, that extends laterally outward from a side of the refuse vehicle 100. The lift assembly 160 includes an interface assembly, shown as grabber assembly 162, that is configured to engage a refuse container (e.g., a residential garbage can) to selectively couple the refuse container to the lift assembly 160. The grabber assembly 162 includes a main portion, shown as main body 164, and a pair of fingers or interface members, shown as grabber fingers 166. The grabber fingers 166 are pivotally coupled to the main body 164 such that the grabber fingers 166 are each rotatable about a vertical axis. A pair of actuators (e.g., hydraulic motors, electric motors, etc.), shown as finger actuators 168, are configured to control movement of the grabber fingers 166 relative to the main body 164.

The grabber assembly 162 is movably coupled to a guide, shown as track 170, that extends vertically along a side of the refuse vehicle 100. Specifically, the main body 164 is slidably coupled to the track 170 such that the main body 164 is repositionable along a length of the track 170. An actuator (e.g., a hydraulic motor, an electric motor, etc.), shown as lift actuator 172, is configured to control movement of the grabber assembly 162 along the length of the track 170. In some embodiments, a bottom end portion of the track 170 is straight and substantially vertical such that the grabber assembly 162 raises or lowers a refuse container when moving along the bottom end portion of the track 170. In some embodiments, a top end portion of the track 170 is curved such that the grabber assembly 162 inverts a refuse container to dump refuse into the hopper volume 132 when moving along the top end portion of the track 170.

The lift assembly 160 further includes an actuator (e.g., a hydraulic cylinder, an electric linear actuator, etc.), shown as track actuator 174, that is configured to control lateral movement of the grabber assembly 162. By way of example, the track actuator 174 may be coupled to the chassis 20 and the track 170 such that the track actuator 174 moves the track 170 and the grabber assembly 162 laterally relative to the chassis 20. The track actuator 174 may facilitate repositioning the grabber assembly 162 to pick up and replace refuse containers that are spaced laterally outward from the refuse vehicle 100.

C. Concrete Mixer Truck

Figure 9:
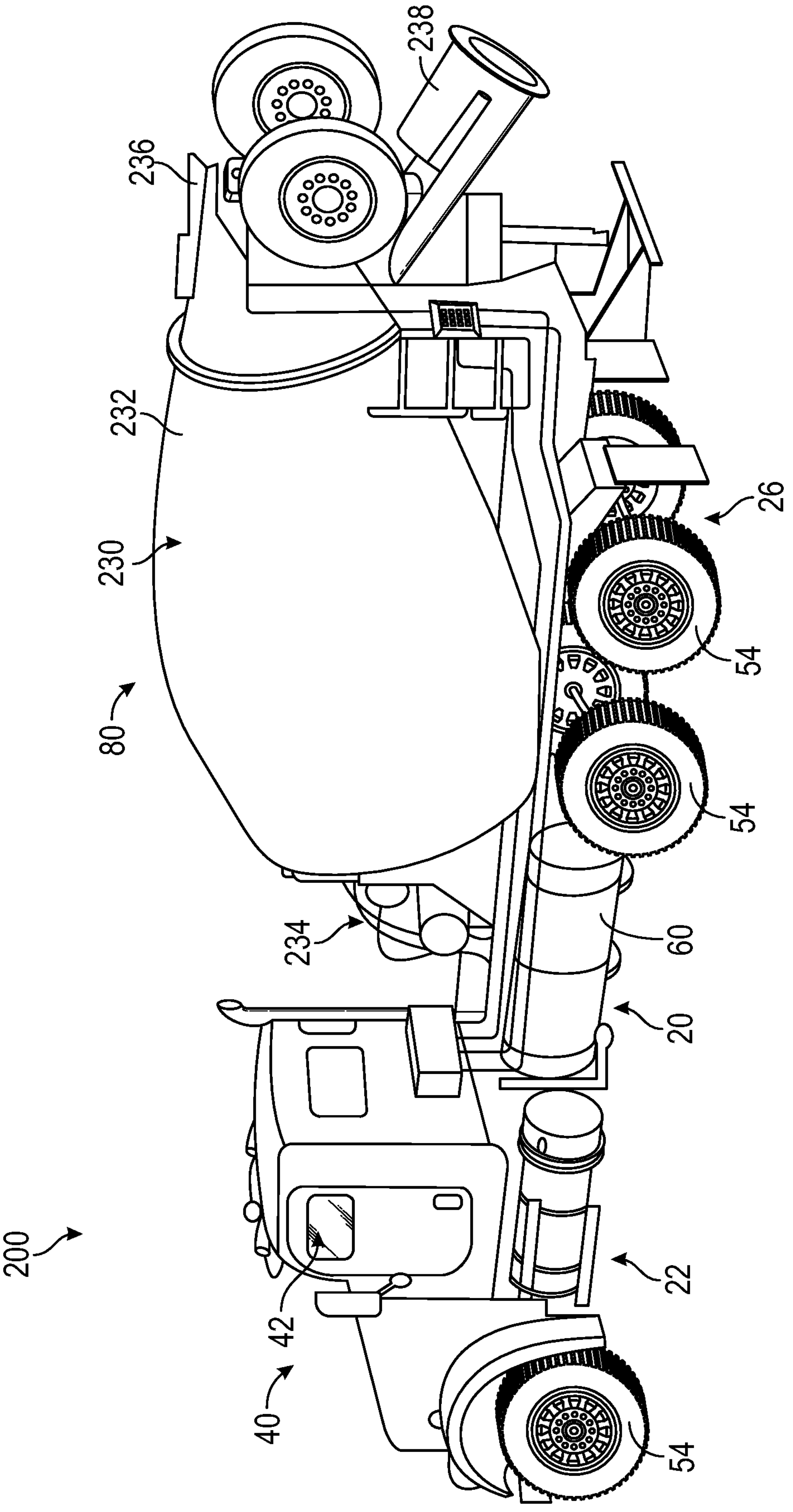
FIG. 9 is a perspective view of the vehicle of FIG. 1 configured as a mixer vehicle, according to an exemplary embodiment.

Referring now to FIG. 9, the vehicle 10 is configured as a mixer truck (e.g., a concrete mixer truck, a mixer vehicle, etc.), shown as mixer truck 200. Specifically, the mixer truck 200 is shown as a rear-discharge concrete mixer truck. In other embodiments, the mixer truck 200 is a front-discharge concrete mixer truck.

As shown in FIG. 9, the application kit 80 includes a mixing drum assembly (e.g., a concrete mixing drum), shown as drum assembly 230. The drum assembly 230 may include a mixing drum 232, a drum drive system 234 (e.g., a rotational actuator or motor, such as an electric motor or hydraulic motor), an inlet portion, shown as hopper 236, and an outlet portion, shown as chute 238. The mixing drum 232 may be coupled to the chassis 20 and may be disposed behind the cab 40 (e.g., at the rear and/or middle of the chassis 20). In an exemplary embodiment, the drum drive system 234 is coupled to the chassis 20 and configured to selectively rotate the mixing drum 232 about a central, longitudinal axis. According to an exemplary embodiment, the central, longitudinal axis of the mixing drum 232 may be elevated from the chassis 20 (e.g., from a horizontal plane extending along the chassis 20) at an angle in the range of five degrees to twenty degrees. In other embodiments, the central, longitudinal axis may be elevated by less than five degrees (e.g., four degrees, etc.). In yet another embodiment, the mixer truck 200 may include an actuator positioned to facilitate adjusting the central, longitudinal axis to a desired or target angle (e.g., manually in response to an operator input/command, automatically according to a control system, etc.).

The mixing drum 232 may be configured to receive a mixture, such as a concrete mixture (e.g., cementitious material, aggregate, sand, etc.), through the hopper 236. In some embodiments, the mixer truck 200 includes an injection system (e.g., a series of nozzles, hoses, and/or valves) including an injection valve that selectively fluidly couples a supply of fluid to the inner volume of the mixing drum 232. By way of example, the injection system may be used to inject water and/or chemicals (e.g., air entrainers, water reducers, set retarders, set accelerators, superplasticizers, corrosion inhibitors, coloring, calcium chloride, minerals, and/or other concrete additives, etc.) into the mixing drum 232. The injection valve may facilitate injecting water and/or chemicals from a fluid reservoir (e.g., a water tank, etc.) into the mixing drum 232, while preventing the mixture in the mixing drum 232 from exiting the mixing drum 232 through the injection system. In some embodiments, one or more mixing elements (e.g., fins, etc.) may be positioned in the interior of the mixing drum 232, and may be configured to agitate the contents of the mixture when the mixing drum 232 is rotated in a first direction (e.g., counterclockwise, clockwise, etc.), and drive the mixture out through the chute 238 when the mixing drum 232 is rotated in a second direction (e.g., clockwise, counterclockwise, etc.). In some embodiments, the chute 238 may also include an actuator positioned such that the chute 238 may be selectively pivotable to position the chute 238 (e.g., vertically, laterally, etc.), for example at an angle at which the mixture is expelled from the mixing drum 232.

D. Fire Truck

Figure 10:
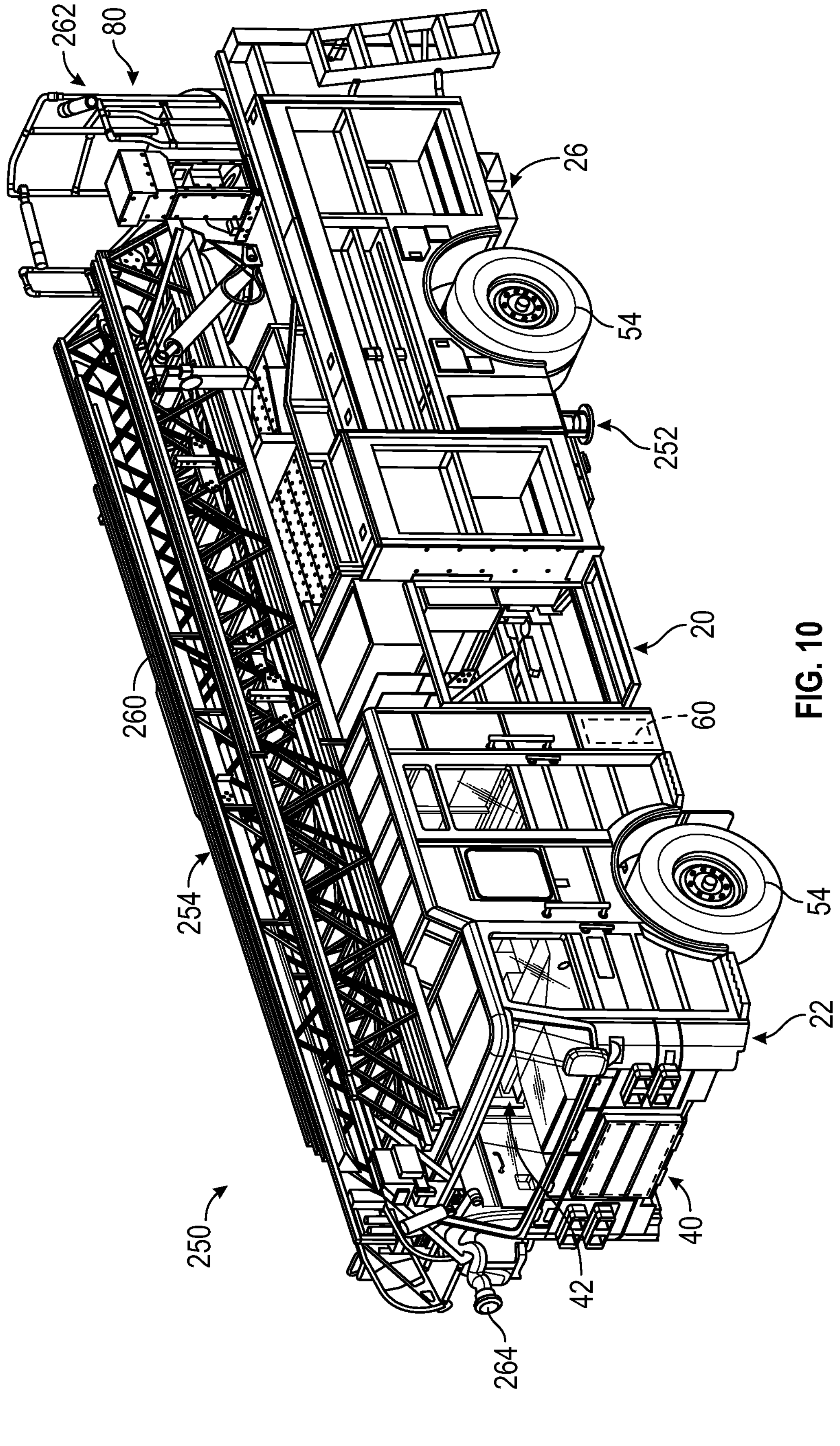
FIG. 10 is a perspective view of the vehicle of FIG. 1 configured as a fire fighting vehicle, according to an exemplary embodiment.

Referring now to FIG. 10, the vehicle 10 is configured as a fire fighting vehicle, fire truck, or fire apparatus (e.g., a turntable ladder truck, a pumper truck, a quint, etc.), shown as fire fighting vehicle 250. In the embodiment shown in FIG. 10, the fire fighting vehicle 250 is configured as a rear-mount aerial ladder truck. In other embodiments, the fire fighting vehicle 250 is configured as a mid-mount aerial ladder truck, a quint fire truck (e.g., including an on-board water storage, a hose storage, a water pump, etc.), a tiller fire truck, a pumper truck (e.g., without an aerial ladder), or another type of response vehicle. By way of example, the vehicle 10 may be configured as a police vehicle, an ambulance, a tow truck, or still other vehicles used for responding to a scene (e.g., an accident, a fire, an incident, etc.).

As shown in FIG. 10, in the fire fighting vehicle 250, the application kit 80 is positioned mainly rearward from the cab 40. The application kit 80 includes deployable stabilizers (e.g., outriggers, downriggers, etc.), shown as outriggers 252, that are coupled to the chassis 20. The outriggers 252 may be configured to selectively extend from each lateral side and/or the rear of the fire fighting vehicle 250 and engage a support surface (e.g., the ground) to provide increased stability while the fire fighting vehicle 250 is stationary. The fire fighting vehicle 250 further includes an extendable or telescoping ladder assembly, shown as ladder assembly 254. The increased stability provided by the outriggers 252 is desirable when the ladder assembly 254 is in use (e.g., extended from the fire fighting vehicle 250) to prevent tipping. In some embodiments, the application kit 80 further includes various storage compartments (e.g., cabinets, lockers, etc.) that may be selectively opened and/or accessed for storage and/or component inspection, maintenance, and/or replacement.

As shown in FIG. 10, the ladder assembly 254 includes a series of ladder sections 260 that are slidably coupled with one another such that the ladder sections 260 may extend and/or retract (e.g., telescope) relative to one another to selectively vary a length of the ladder assembly 254. A base platform, shown as turntable 262, is rotatably coupled to the chassis 20 and to a proximal end of a base ladder section 260 (i.e., the most proximal of the ladder sections 260). The turntable 262 may be configured to rotate about a vertical axis relative to the chassis 20 to rotate the ladder sections 260 about the vertical axis (e.g., up to 360 degrees, etc.). The ladder sections 260 may rotate relative to the turntable 262 about a substantially horizontal axis to selectively raise and lower the ladder sections 260 relative to the chassis 20. As shown, a water turret or implement, shown as monitor 264, is coupled to a distal end of a fly ladder section 260 (i.e., the most distal of the ladder sections 260). The monitor 264 may be configured to expel water and/or a fire suppressing agent (e.g., foam, etc.) from a water storage tank and/or an agent tank onboard the fire fighting vehicle 250, and/or from an external source (e.g., a fire hydrant, a separate water/pumper truck, etc.). In some embodiments, the ladder assembly 254 further includes an aerial platform coupled to the distal end of the fly ladder section 260 and configured to support one or more operators.

E. ARFF Truck

Figure 11:
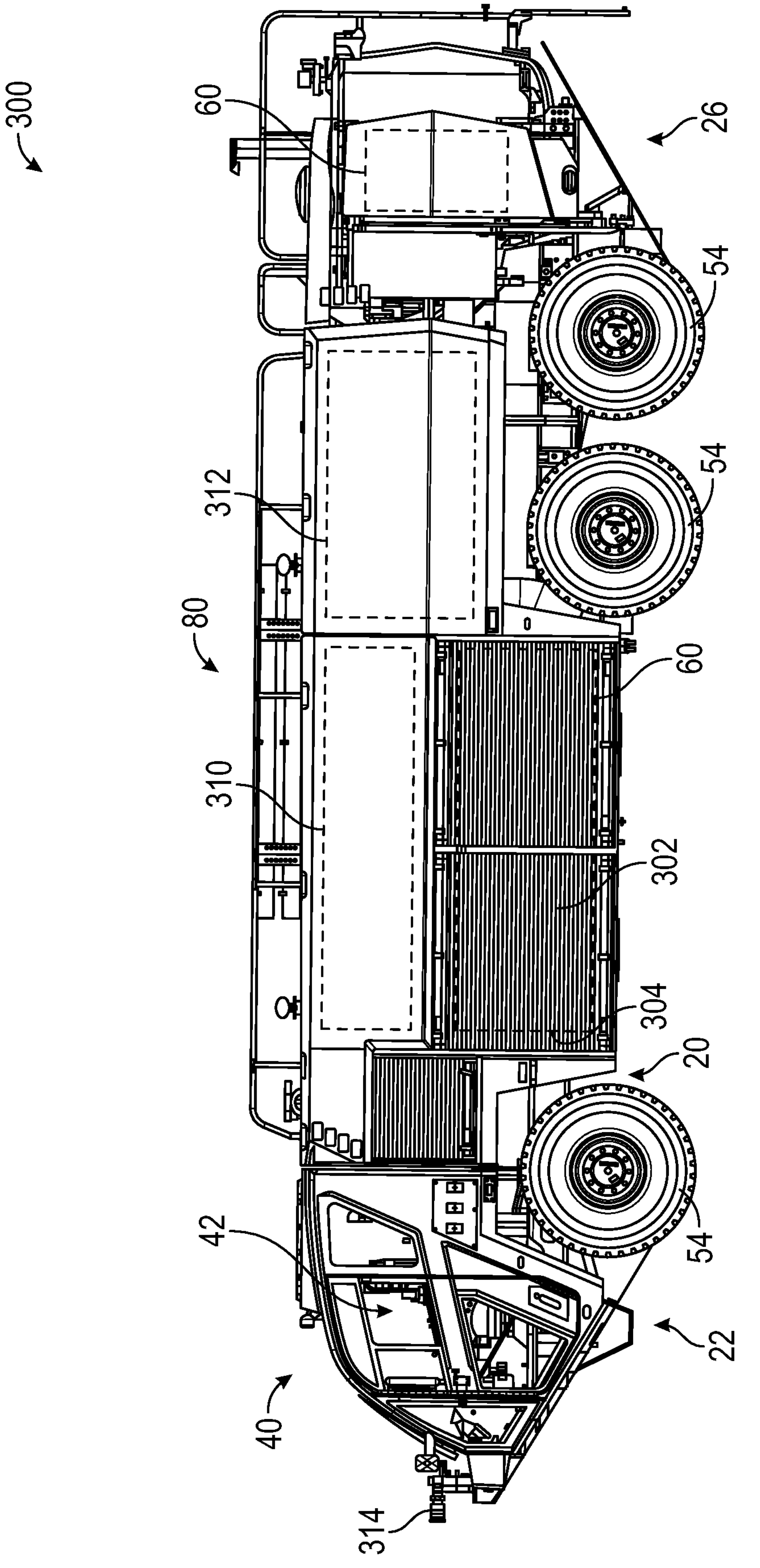
FIG. 11 is a left-side view of the vehicle of FIG. 1 configured as an airport fire-fighting vehicle, according to an exemplary embodiment.

Referring now to FIG. 11, the vehicle 10 is configured as a fire fighting vehicle, shown as airport rescue and firefighting (ARFF) truck 300. As shown in FIG. 11, the application kit 80 is positioned primarily rearward of the cab 40. As shown, the application kit 80 includes a series of storage compartments or cabinets, shown as compartments 302, that are coupled to the chassis 20. The compartments 302 may store various equipment or components of the ARFF truck 300.

The application kit 80 includes a pump system 304 (e.g., an ultra-high-pressure pump system, etc.) positioned within one of the compartments 302 near the center of the ARFF truck 300. The application kit 80 further includes a water tank 310, an agent tank 312, and an implement or water turret, shown as monitor 314. The pump system 304 may include a high-pressure pump and/or a low-pressure pump, which may be fluidly coupled to the water tank 310 and/or the agent tank 312. The pump system 304 may to pump water and/or fire suppressing agent from the water tank 310 and the agent tank 312, respectively, to the monitor 314. The monitor 314 may be selectively reoriented by an operator to adjust a direction of a stream of water and/or agent. As shown in FIG. 11, the monitor 314 is coupled to a front end of the cab 40.

F. Boom Lift

Figure 12:
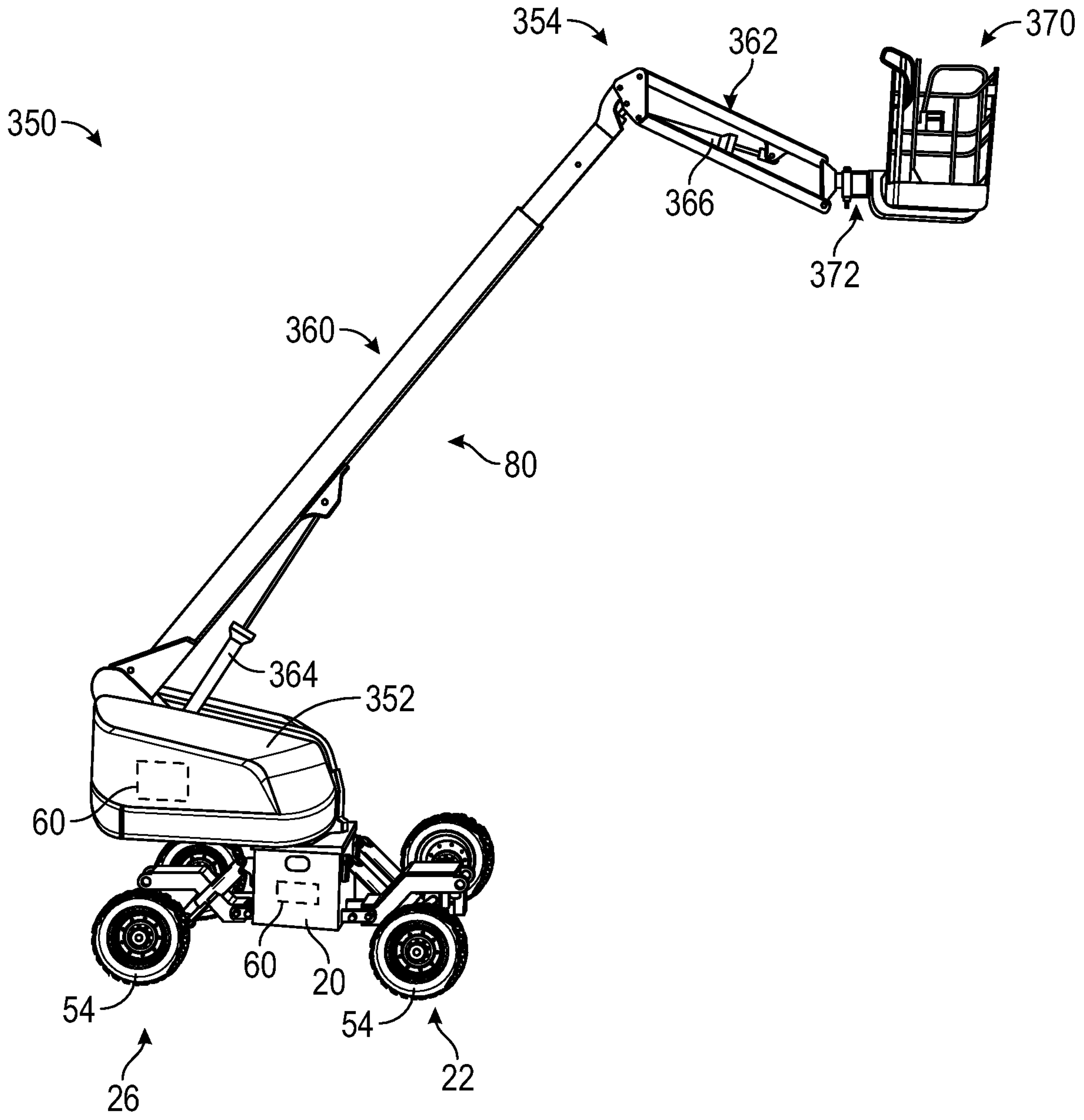
FIG. 12 is a perspective view of the vehicle of FIG. 1 configured as a boom lift, according to an exemplary embodiment.

Referring now to FIG. 12, the vehicle 10 is configured as a lift device, shown as boom lift 350. The boom lift 350 may be configured to support and elevate one or more operators. In other embodiments, the vehicle 10 is configured as another type of lift device that is configured to lift operators and/or material, such as a skid-loader, a telehandler, a scissor lift, a forklift, a vertical lift, and/or any other type of lift device or machine.

As shown in FIG. 12, the application kit 80 includes a base assembly, shown as turntable 352, that is rotatably coupled to the chassis 20. The turntable 352 may be configured to selectively rotate relative to the chassis 20 about a substantially vertical axis. In some embodiments, the turntable 352 includes a counterweight (e.g., the batteries) positioned near the rear of the turntable 352. The turntable 352 is rotatably coupled to a lift assembly, shown as boom assembly 354. The boom assembly 354 includes a first section or telescoping boom section, shown as lower boom 360. The lower boom 360 includes a series of nested boom sections that extend and retract (e.g., telescope) relative to one another to vary a length of the boom assembly 354. The boom assembly 354 further includes a second boom section or four bar linkage, shown as upper boom 362. The upper boom 362 may include structural members that rotate relative to one another to raise and lower a distal end of the boom assembly 354. In other embodiments, the boom assembly 354 includes more or fewer boom sections (e.g., one, three, five, etc.) and/or a different arrangement of boom sections.

As shown in FIG. 12, the boom assembly 354 includes a first actuator, shown as lower lift cylinder 364. The lower boom 360 is pivotally coupled (e.g., pinned, etc.) to the turntable 352 at a joint or lower boom pivot point. The lower lift cylinder 364 (e.g., a pneumatic cylinder, an electric linear actuator, a hydraulic cylinder, etc.) is coupled to the turntable 352 at a first end and coupled to the lower boom 360 at a second end. The lower lift cylinder 364 may be configured to raise and lower the lower boom 360 relative to the turntable 352 about the lower boom pivot point.

The boom assembly 354 further includes a second actuator, shown as upper lift cylinder 366. The upper boom 362 is pivotally coupled (e.g., pinned) to the upper end of the lower boom 360 at a joint or upper boom pivot point. The upper lift cylinder 366 (e.g., a pneumatic cylinder, an electric linear actuator, a hydraulic cylinder, etc.) is coupled to the upper boom 362. The upper lift cylinder 366 may be configured to extend and retract to actuate (e.g., lift, rotate, elevate, etc.) the upper boom 362, thereby raising and lowering a distal end of the upper boom 362.

Referring still to FIG. 12, the application kit 80 further includes an operator platform, shown as platform assembly 370, coupled to the distal end of the upper boom 362 by an extension arm, shown as jib arm 372. The jib arm 372 may be configured to pivot the platform assembly 370 about a lateral axis (e.g., to move the platform assembly 370 up and down, etc.) and/or about a vertical axis (e.g., to move the platform assembly 370 left and right, etc.).

The platform assembly 370 provides a platform configured to support one or more operators or users. In some embodiments, the platform assembly 370 may include accessories or tools configured for use by the operators. For example, the platform assembly 370 may include pneumatic tools (e.g., an impact wrench, airbrush, nail gun, ratchet, etc.), plasma cutters, welders, spotlights, etc. In some embodiments, the platform assembly 370 includes a control panel (e.g., a user interface, a removable or detachable control panel, etc.) configured to control operation of the boom lift 350 (e.g., the turntable 352, the boom assembly 354, etc.) from the platform assembly 370 or remotely. In other embodiments, the platform assembly 370 is omitted, and the boom lift 350 includes an accessory and/or tool (e.g., forklift forks, etc.) coupled to the distal end of the boom assembly 354.

G. Scissor Lift

Figure 13:
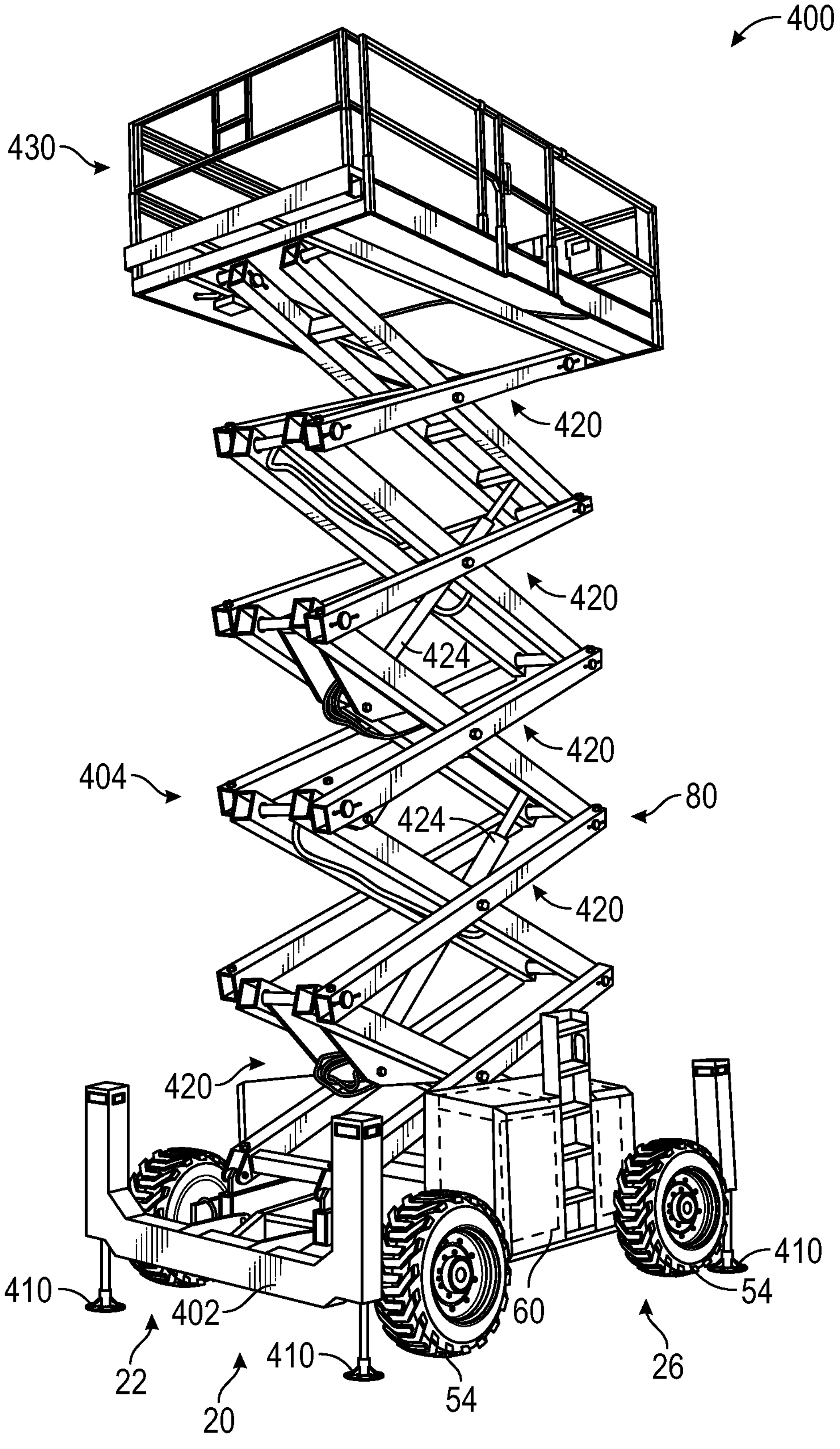
FIG. 13 is a perspective view of the vehicle of FIG. 1 configured as a scissor lift, according to an exemplary embodiment.

Referring now to FIG. 13, the vehicle 10 is configured as a lift device, shown as scissor lift 400. As shown in FIG. 13, the application kit 80 includes a body, shown as lift base 402, coupled to the chassis 20. The lift base 402 is coupled to a scissor assembly, shown as lift assembly 404, such that the lift base 402 supports the lift assembly 404. The lift assembly 404 is configured to extend and retract, raising and lowering between a raised position and a lowered position relative to the lift base 402.

As shown in FIG. 13, the lift base 402 includes a series of actuators, stabilizers, downriggers, or outriggers, shown as leveling actuators 410. The leveling actuators 410 may extend and retract vertically between a stored position and a deployed position. In the stored position, the leveling actuators 410 may be raised, such that the leveling actuators 410 do not contact the ground. Conversely, in the deployed position, the leveling actuators 410 may engage the ground to lift the lift base 402. The length of each of the leveling actuators 410 in their respective deployed positions may be varied in order to adjust the pitch (e.g., rotational position about a lateral axis) and the roll (e.g., rotational position about a longitudinal axis) of the lift base 402 and/or the chassis 20. Accordingly, the lengths of the leveling actuators 410 in their respective deployed positions may be adjusted to level the lift base 402 with respect to the direction of gravity (e.g., on uneven, sloped, pitted, etc. terrain). The leveling actuators 410 may lift the wheel and tire assemblies 54 off the ground to prevent movement of the scissor lift 400 during operation. In other embodiments, the leveling actuators 410 are omitted.

The lift assembly 404 may include a series of subassemblies, shown as scissor layers 420, each including a pair of inner members and a pair of outer members pivotally coupled to one another. The scissor layers 420 may be stacked atop one another in order to form the lift assembly 404, such that movement of one scissor layer 420 causes a similar movement in all of the other scissor layers 420. The scissor layers 420 extend between and couple the lift base 402 and an operator platform (e.g., the platform assembly 430). In some embodiments, scissor layers 420 may be added to, or removed from, the lift assembly 404 in order to increase, or decrease, the fully extended height of the lift assembly 404.

Referring still to FIG. 13, the lift assembly 404 may also include one or more lift actuators 424 (e.g., hydraulic cylinders, pneumatic cylinders, electric linear actuators such as motor-driven leadscrews, etc.) configured to extend and retract the lift assembly 404. The lift actuators 424 may be pivotally coupled to inner members of various scissor layers 420, or otherwise arranged within the lift assembly 404.

A distal or upper end of the lift assembly 404 is coupled to an operator platform, shown as platform assembly 430. The platform assembly 430 may perform similar functions to the platform assembly 370, such as supporting one or more operators, accessories, and/or tools. The platform assembly 430 may include a control panel to control operation of the scissor lift 400. The lift actuators 424 may be configured to actuate the lift assembly 404 to selectively reposition the platform assembly 430 between a lowered position (e.g., where the platform assembly 430 is proximate to the lift base 402) and a raised position (e.g., where the platform assembly 430 is at an elevated height relative to the lift base 402). Specifically, in some embodiments, extension of the lift actuators 424 moves the platform assembly 430 upward (e.g., extending the lift assembly 404), and retraction of the lift actuators 424 moves the platform assembly 430 downward (e.g., retracting the lift assembly 404). In other embodiments, extension of the lift actuators 424 retracts the lift assembly 404, and retraction of the lift actuators 424 extends the lift assembly 404.

Lighting Systems

Referring to FIGS. 1, 5, and 14-24, the vehicle 10 includes one or more projectors 500. The projectors 500 can include one or more lighting assemblies 502, 504 to generate light. In some examples, lighting assemblies 502, 504 are positioned on opposite sides of the track 170 of and the grabber assembly 162. The lighting assemblies 502, 504 are each arranged to emit light downward and outward toward the ground below and outward from the vehicle 10. The lighting assemblies 502, 504 can include one or more light emitting diodes (LEDs), lamps, or lasers for example, that generate visible light (i.e., light within the visible spectrum, having a wavelength between about 400 nm and 700 nm). In some examples, the lighting assemblies 502, 504 are configured to emit light outside of the visible spectrum (e.g., infrared light, ultraviolet light) onto the ground surface below and outward from the vehicle 10.

Figure 6:
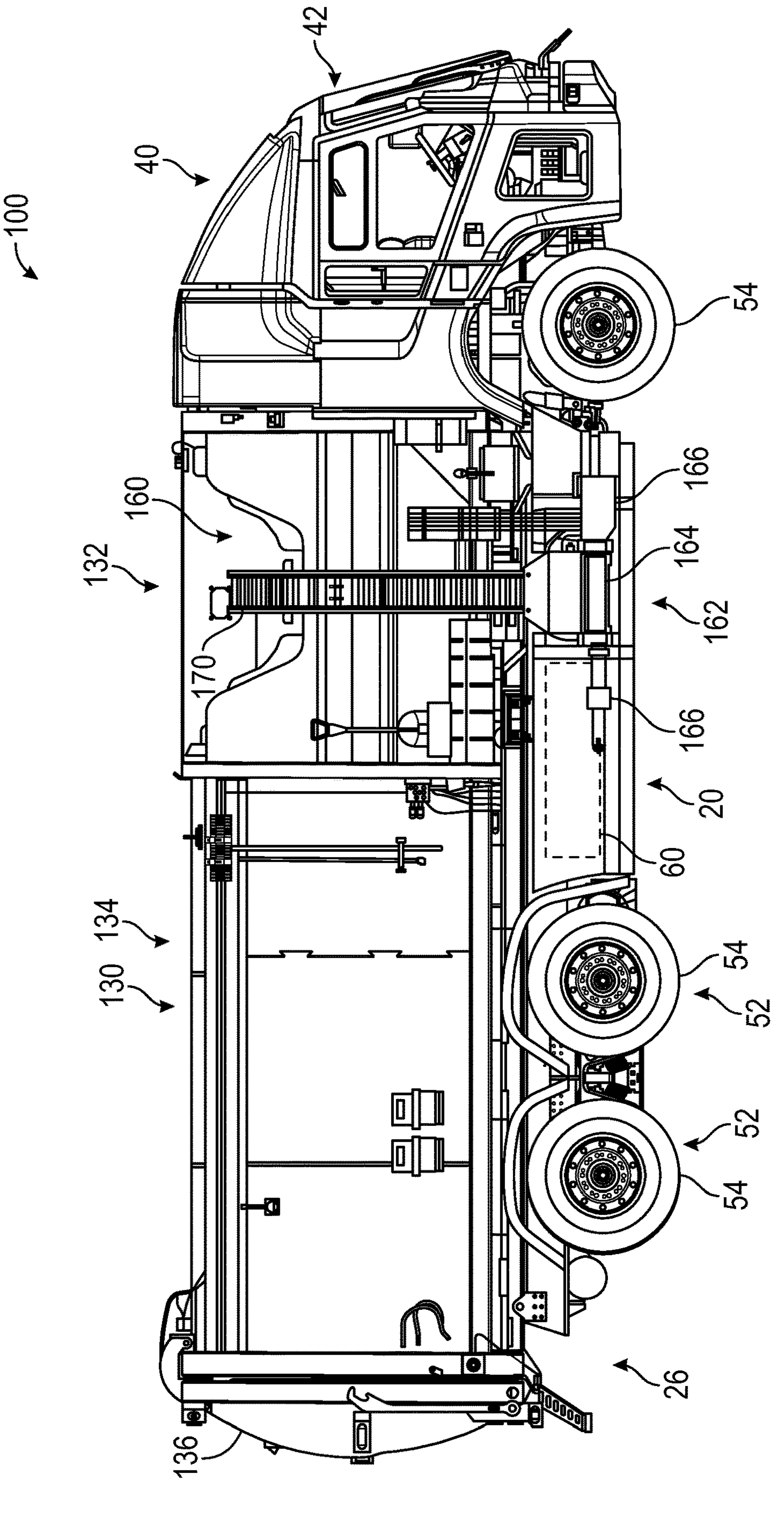
FIG. 6 is a right-side view of the side-loading refuse vehicle of FIG. 5.
Figure 7:
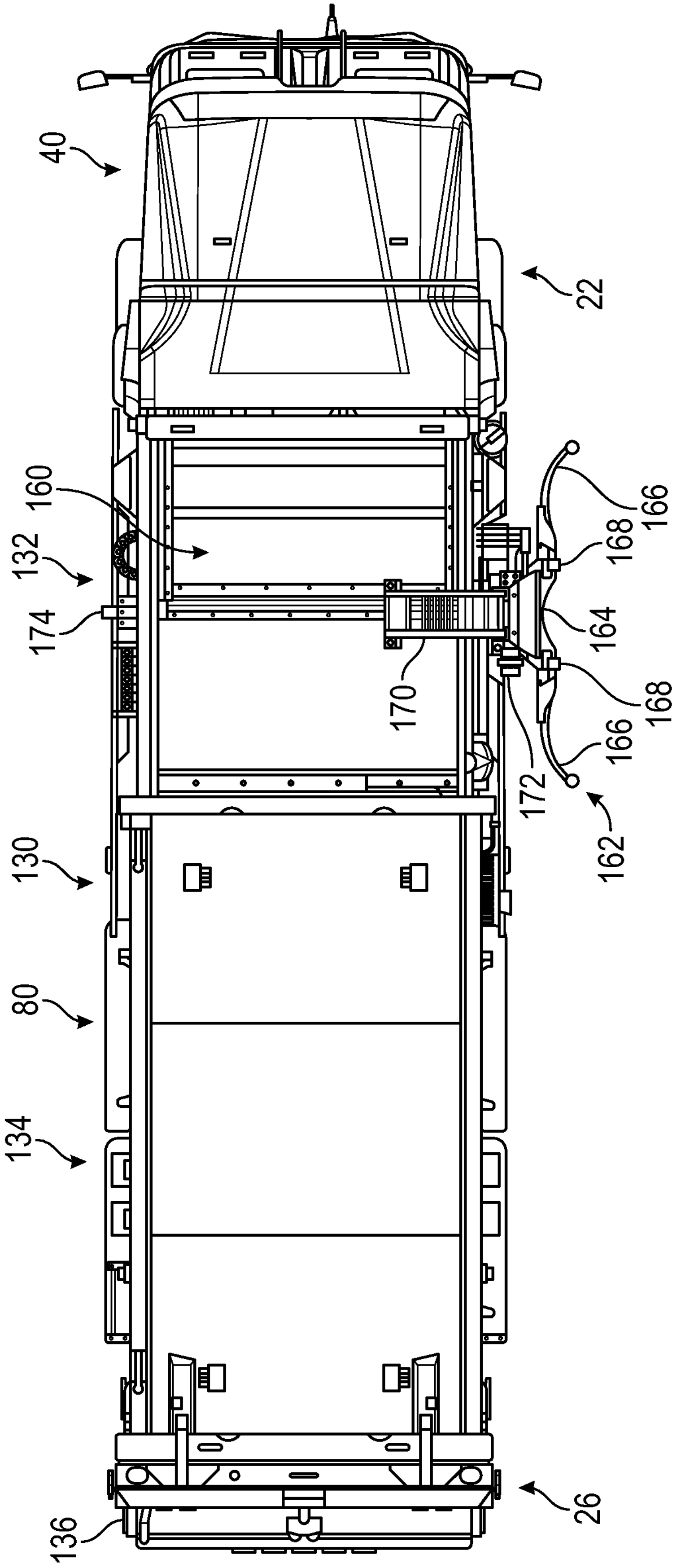
FIG. 7 is a top view of the side-loading refuse vehicle of FIG. 5.

The light emitted by the projectors 500 defines a target or operational area 510 below and outward from the vehicle 10. The target area 510 can be configured to correspond directly to the lateral distance or area between the two grabber fingers 166 of the grabber assembly 162 (as depicted in FIG. 6). Accordingly, the target area 510 can correspond to a range of locations in which, if a waste container 600 is positioned, the grabber assembly 162 will be able to properly engage the waste container 600 without requiring additional movement between the vehicle 10 and the waste container 600. Stated otherwise, if the waste container 600 is positioned within the target area 510 defined by the projectors 500, the grabber assembly 162 can engage the waste container 600 and collect waste from the waste container 600 without requiring the vehicle 10 to drive in any direction.

Figure 14:
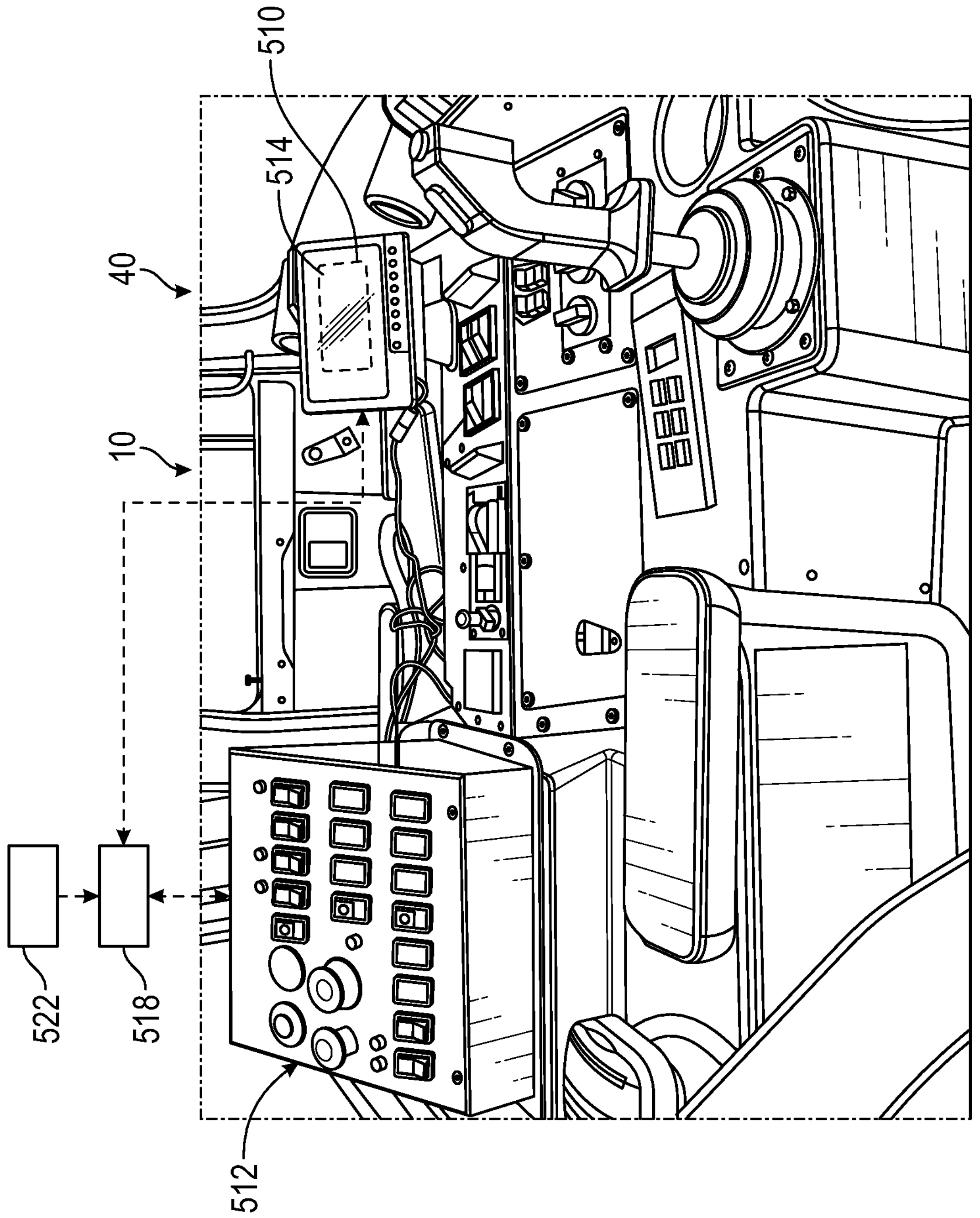
FIG. 14 is a perspective view of an interior of a cab of the vehicle of FIG. 1.

The target area 510 generated by the projectors 500 can be visible both externally and internally. By projecting the target area 510 in visible light, operators outside the vehicle 10 can easily identify the location in which the waste containers 600 should be positioned for the grabber assembly 162 to successfully complete the waste collection process, while also being able to recognize areas to avoid standing while the grabber assembly 162 is operating. Simultaneously, the target area 510 can be seen from within the cab 40 of the vehicle 10, as depicted in FIG. 14. The cab 40 of the vehicle 10 can include a control system 512 including a series of inputs, along with a display 514. The display 514 is in communication with one or more cameras 516 positioned along the vehicle 10. The cameras 516 each have a field of view extending outwardly away from the vehicle 10. The cameras 516 are arranged so that their respective field of view overlaps with and includes the target area 510. Media (i.e., images or video) monitored and collected by the cameras 516 is provided to a processing unit 518 within the control system 512, which subsequently provides the media to the display 514 so that the media can be presented and viewed within the cab 40. By presenting the media on the display 514, an operator can view the target area 510 and waste container 600 simultaneously. Accordingly, the operator can verify whether the waste container 600 is present within the target area 510. If the waste container 600 is not positioned within the target area 510, the operator can use the display to determine which direction to drive the vehicle 10 so that the waste container 600 will be positioned within the target area 510. Once the waste container 600 is verified to be present within the target area 510, the operator can initiate the waste collection process (e.g., using inputs within the control system 512) described above. In instances where the projector 500 emits light outside the visible spectrum, the cameras 516 are configured to detect and capture the light emitted from the projector 500 so that the target area 510 is visible on the display 514 but invisible to the naked eye externally from the vehicle 10.

The target area 510 generated by the projector 500 can take on a variety of different formats. For example, as shown in FIGS. 15-18, the projector 500 can produce a rectangular target area 510. The lighting assemblies 502, 504 straddling the grabber assembly 162 emit light having different wavelengths (e.g., yellow, green, red) depending upon a detected location of the waste container 600 relative to the target area 510. A sensor 520 (which can be a camera, imaging device, ultrasonic sensor, LIDAR sensor, etc.) positioned along the vehicle 10 can continuously monitor the target area for obstacles, such as waste containers 600, present within the target area 510. The sensor 520 can be in communication with the processing unit 518 and an image analyzer 522, for example, which analyzes data taken by the sensor and determines whether and where a waste container 600 is located relative to the vehicle 10.

Figure 15:
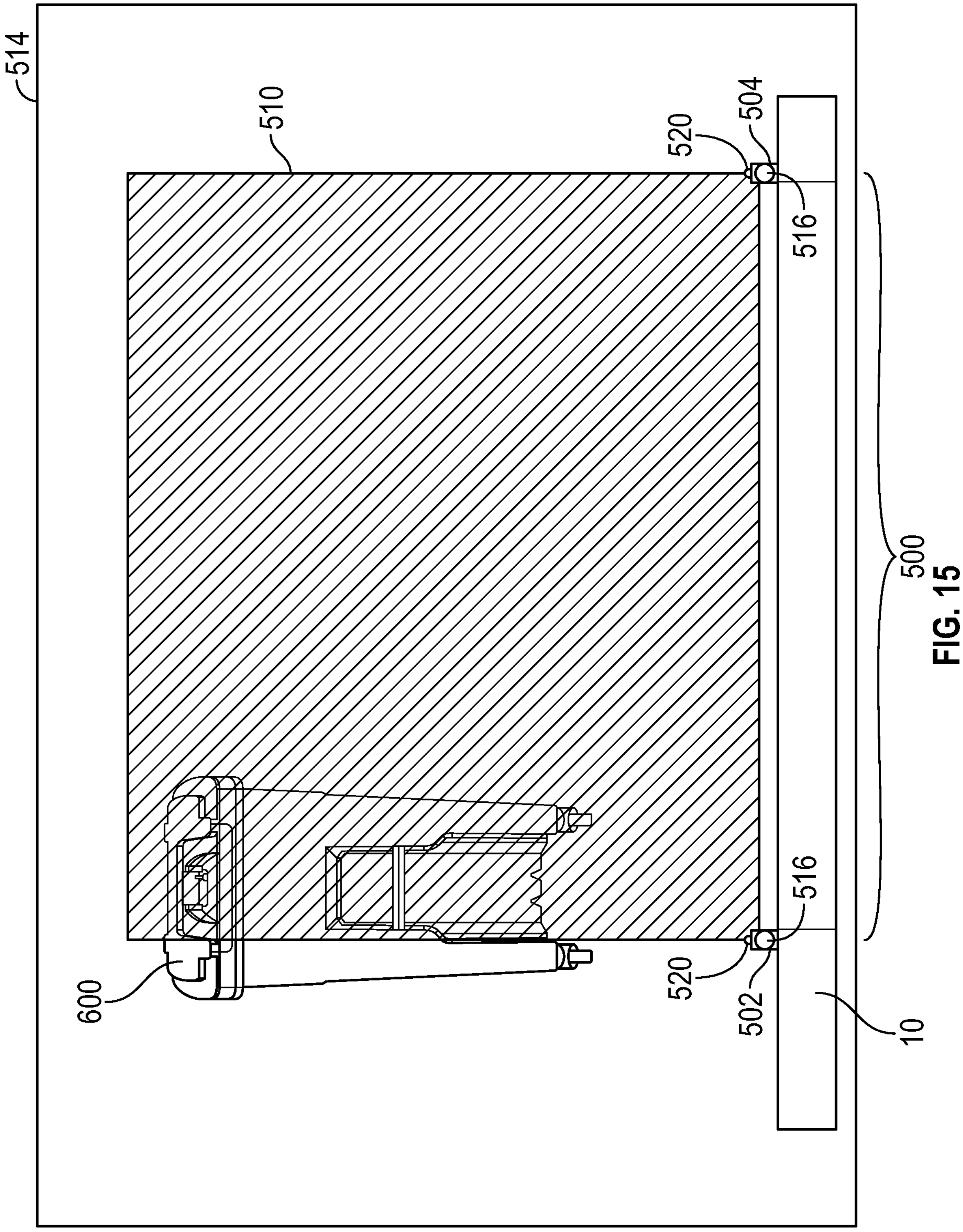
FIG. 15 is a view of an interface that can be projected onto a display within the cab of FIG. 14.

As the vehicle 10 initially approaches a waste container 600, the waste container 600 may be positioned partially or entirely outside of the target area 510 generated by the projector 500. If the sensor 520 detects that a waste container 600 is present within a sensor field of view but outside of the target area 510 generated by the projector 500, the sensor 520 can relay a signal to the processing unit 518. Upon receiving a signal that a waste container 600 is present within the sensor field of view but at least partially outside the target area 510, the processing unit can prompt the projector 500 to adjust a parameter of the light being emitted. For example, and as depicted in FIG. 15, the processing unit 518 can control the projector 500 to emit a red light. The red light can provide a visual cue to the operator that the waste collection process for the waste container 600 is not yet ready to be initiated because the vehicle 10 is not properly aligned relative to the waste container 600. Additionally, or alternatively, the processing unit 518 can control the projector 500 to pulse or otherwise modulate the light emitted from the projector 500 when the waste container 600 is detected to be outside the target area 510. Audio alarms can be generated by the processing unit 518 to further inform the operator within the cab 40 not to initiate the grabber assembly 162 to attempt to engage the waste container 600.

Figure 16:
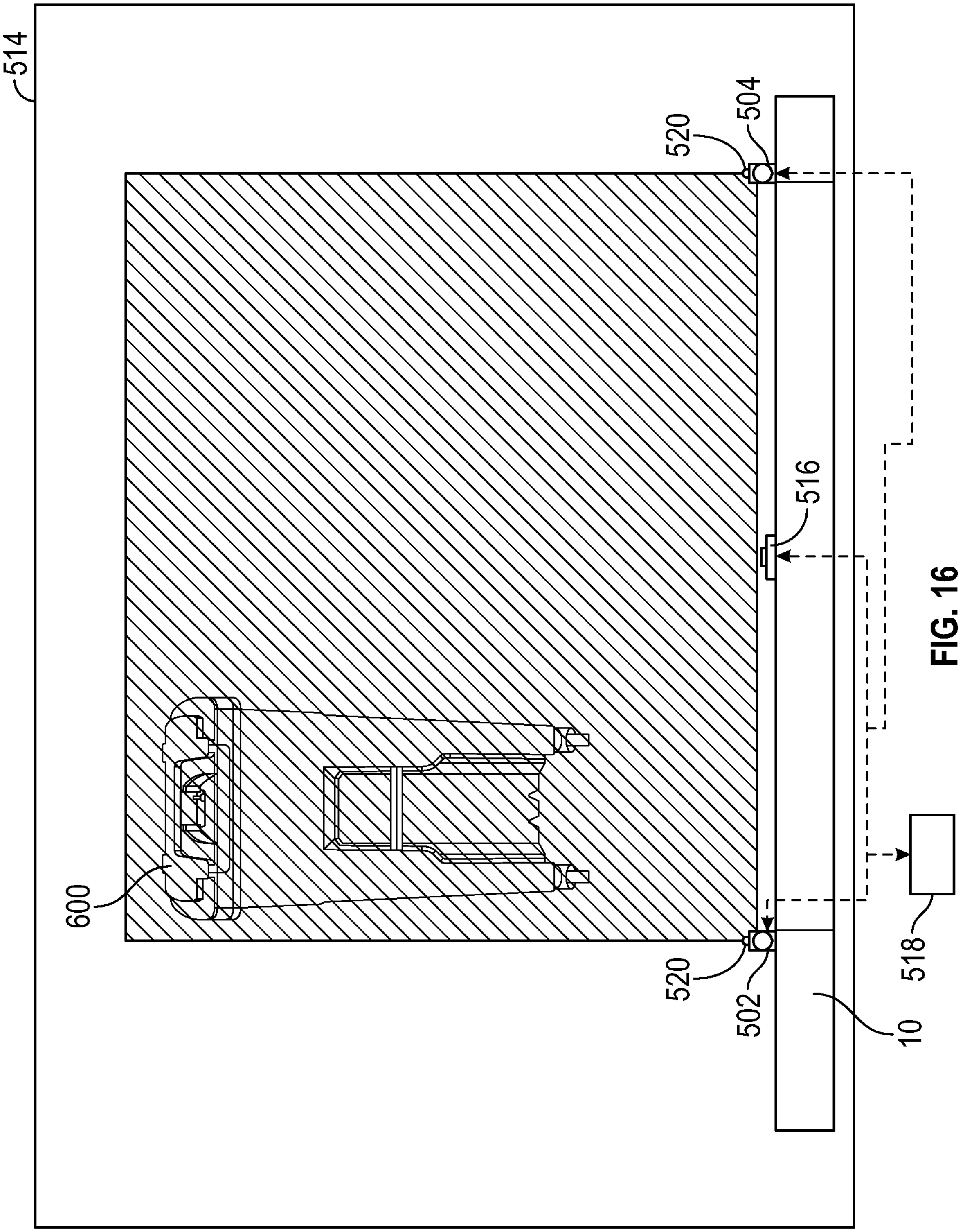
FIG. 16 is another view of an interface that can be projected onto a display within the cab of FIG. 14.
Figure 17:
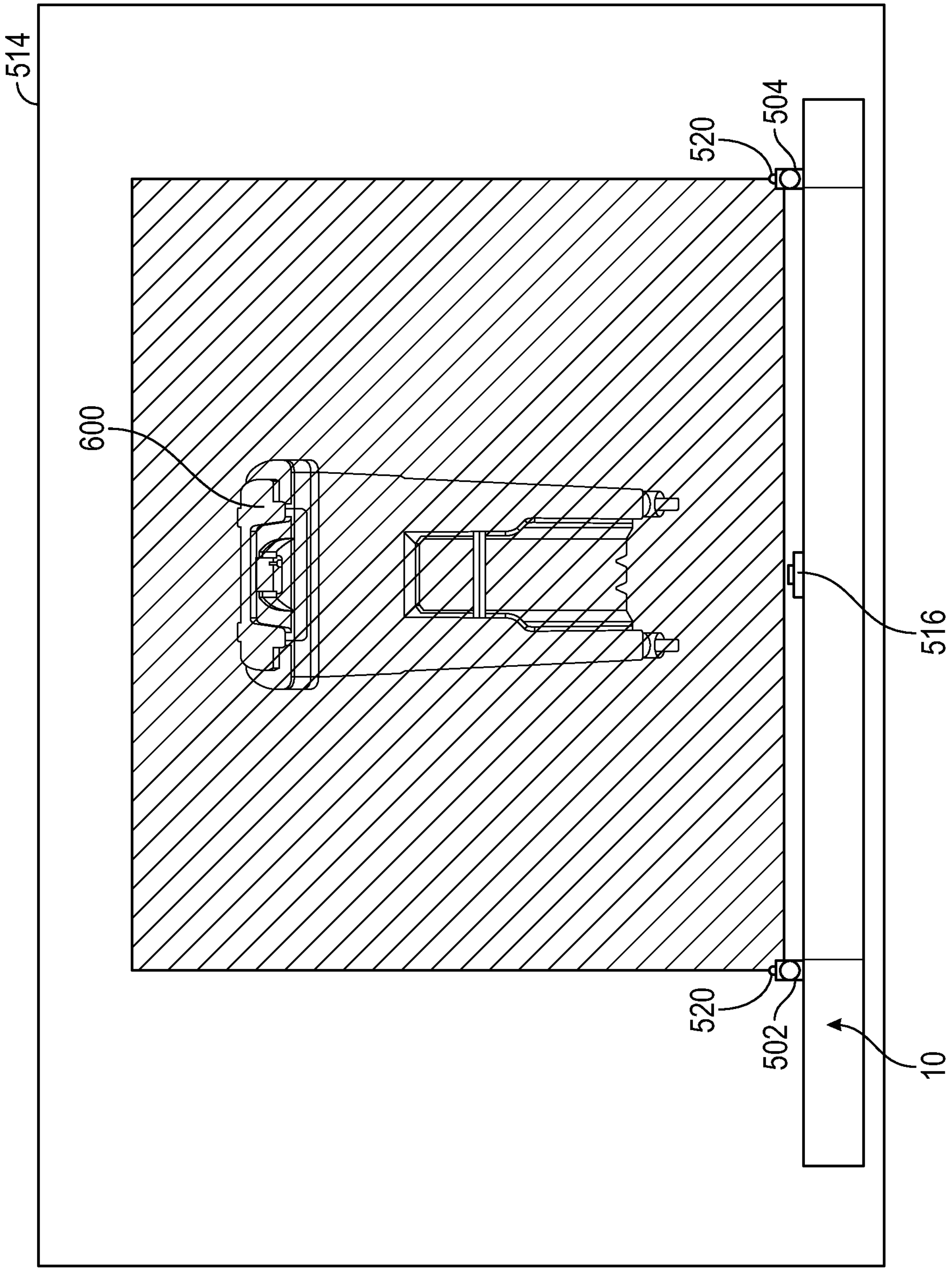
FIG. 17 is another view of an interface that can be projected onto a display within the cab of FIG. 14.
Figure 18:
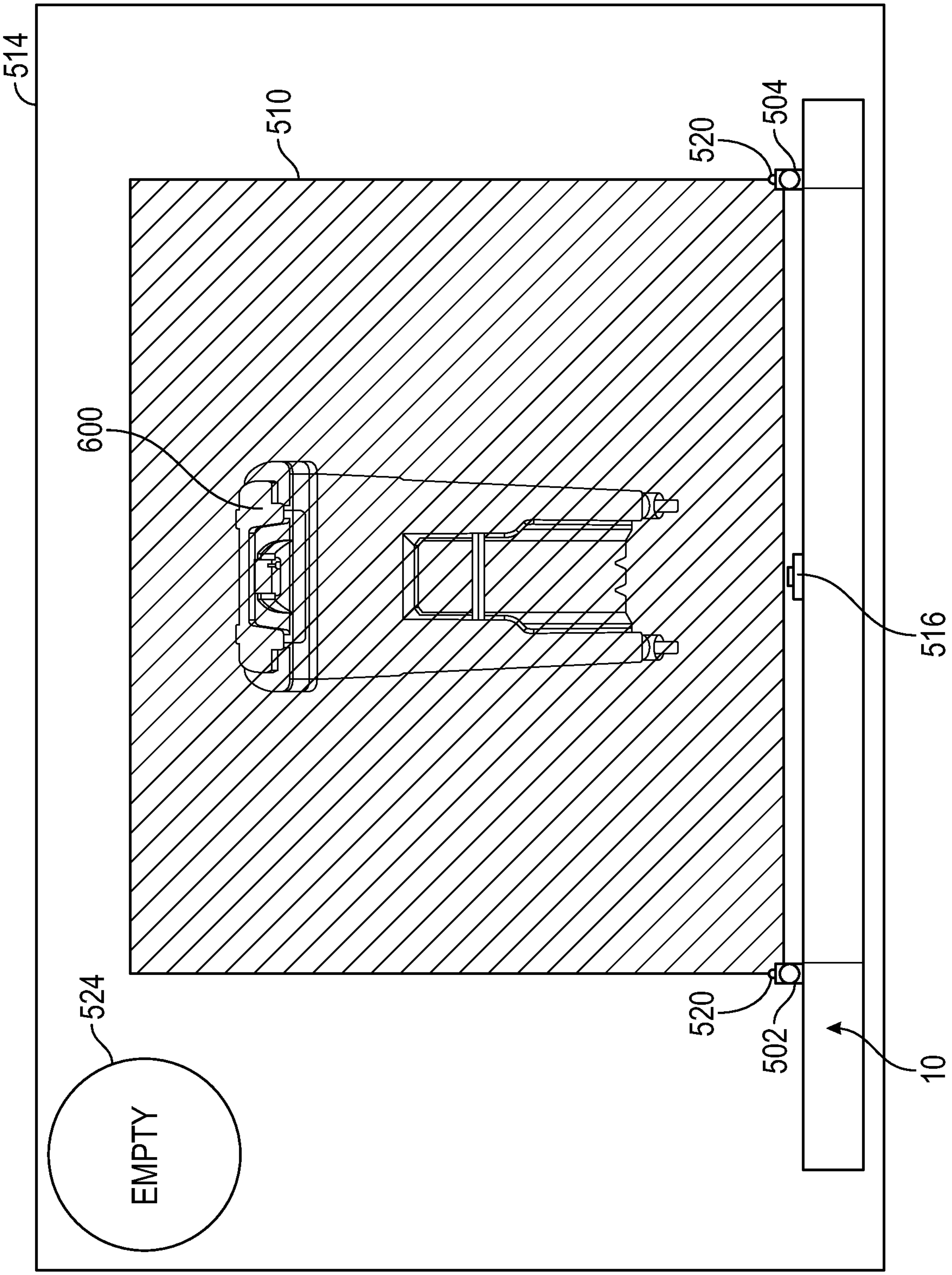
FIG. 18 is another view of an interface that can be projected onto a display within the cab of FIG. 14.

The audio and visual cues provided to the operator can communicate both a direction and magnitude that the vehicle 10 should be moved in order to properly position the refuse vehicle 10 relative to the waste container 600 for waste removal. Using the display 514 within the cab 40, the operator can continuously monitor the position of the waste container 600 relative to the vehicle 10 as the vehicle 10 drives. When the sensor 520 detects that the waste container 600 is present within the target area 510 but positioned off-centered from the lift assembly 160, the sensor 520 can once again convey a signal to the processing unit 518. The processing unit 518 can once again control the projector 500 to adjust a parameter of the emitted light. For example, the projector 500 can be controlled to emit yellow light when the waste container 600 is detected within the target area 510 but within a less preferred region (e.g., near a boundary of the target area 510), as depicted in FIG. 16. Upon receiving visual confirmation that the waste container 600 is present within the target area 510, the operator can initiate a waste removal procedure similar to that described above. Alternatively, the operator can continue to move the vehicle 10 relative to the waste container 600. Once the sensor 520 detects the waste container is present within a preferred region of the target area 510 (e.g., centered), the sensor 520 can pass along a signal to the processing unit 518 indicating the same. The processing unit 518 can then control the projector 500 to once again adjust a parameter of the light being emitted. For example, and as depicted in FIG. 17, the projector 500 can emit a green light to indicate that the waste container 600 is positioned in a desired location within the target area 510 and is ready to be engaged by the lift assembly 160. With this visual confirmation, the operator can initiate the waste collection process from within the cab 40. Alternatively, the waste collection process can be initiated automatically when the processing unit 518 detects that a parking or service brake of the vehicle 10 is engaged and a waste container 600 is detected within the target area 510. In some examples, and as depicted in FIG. 18, an interface on the display 514 presents an input 524 (e.g., a button) on the display 514 that can be actuated by an operator in the cab 40 when the sensor 520 detects that the waste container 600 is positioned properly within the target area 510.

Figure 19:
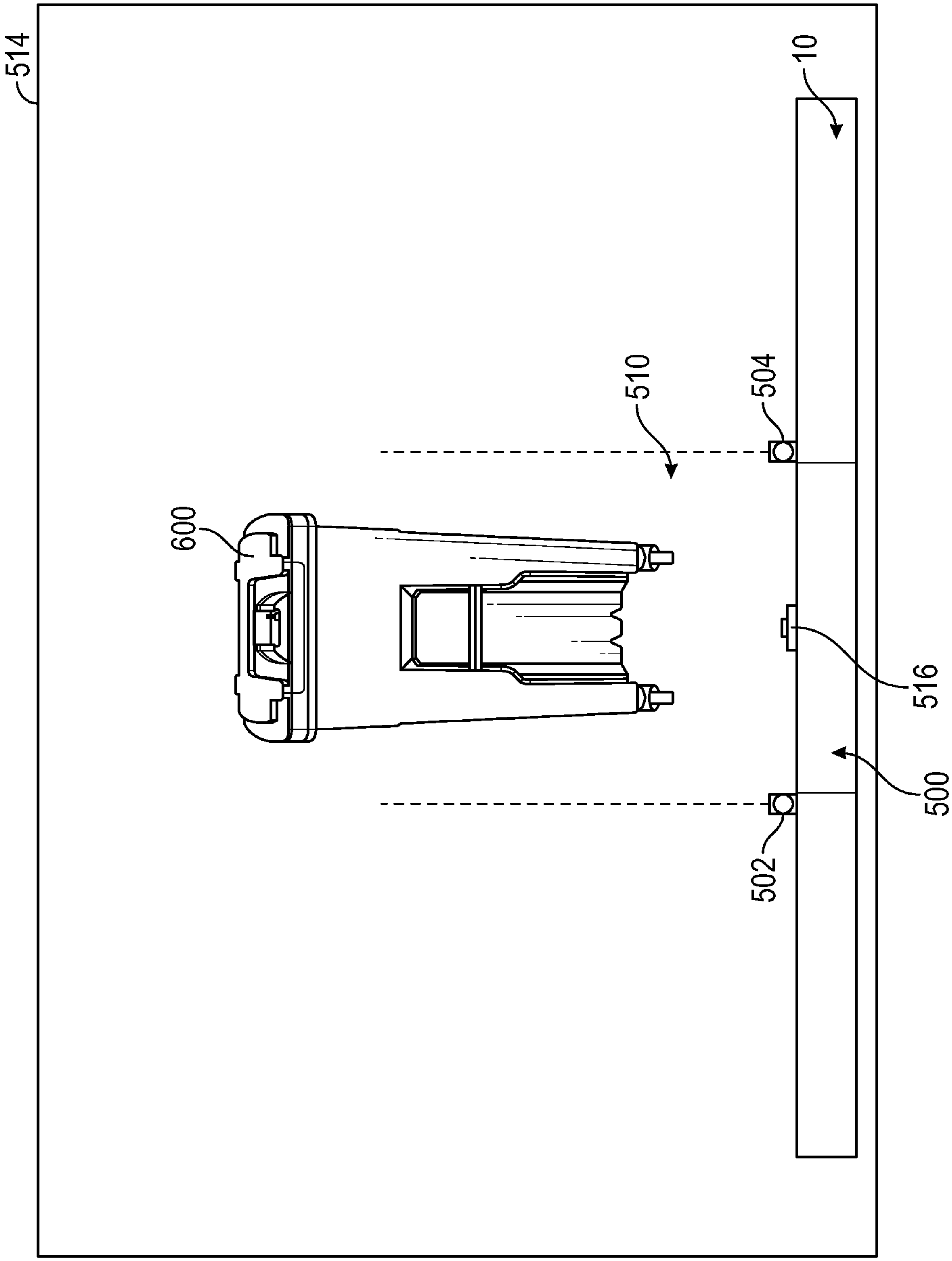
FIG. 19 is another view of an interface that can be projected onto a display within the cab of FIG. 14.

In other examples and as depicted in FIG. 19, the projector 500 emits only the boundaries of the target area 510. For example, each of the lighting assemblies 502, 504 are arranged to emit light in a generally straight line downwardly and outwardly from the vehicle 10. The generally straight lines emitted by the lighting assemblies 502, 504 can collectively define the lateral boundaries of the target area 510. As shown in FIG. 19, for example, the lighting assemblies 502, 504 each emit a solid and continuous (or dashed) line. The lines emitted by the lighting assemblies 502, 504 are once again visible to the operator either directly or via the display 514 and can be used to move the vehicle 10 relative to the waste container 600 until the operator can verify that the waste container 600 is present between both boundaries emitted by the lighting assemblies 502, 504 and, accordingly, within the target area 510.

Figure 20:
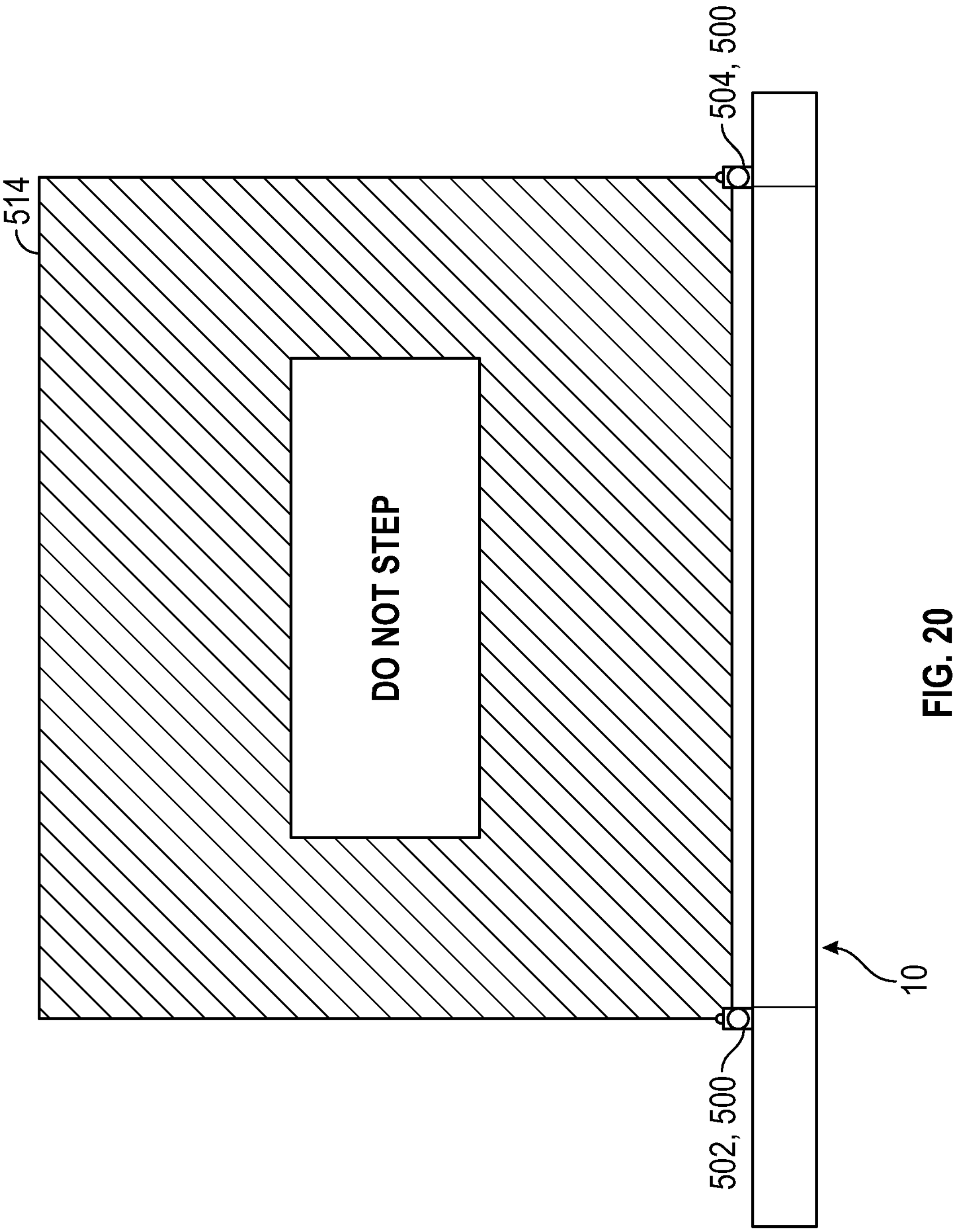
FIG. 20 is a view of a lighting pattern that can be projected onto a ground surface adjacent the vehicle of FIG. 1.

Referring to FIGS. 20-24, the projectors 500 can be configured to illuminate operational areas 510 as well, which can serve as a warning or notification device. For example, and as depicted in FIG. 20, the projectors 500 can be configured to emit light that provides a visible indication of an area to avoid (e.g., a warning area). The light can be patterned or otherwise include messaging indicating to avoid the area. In some examples, the operational area 510 is depicted in a rectangular illumination that is adjacent the vehicle 10, along a ground surface below.

Figure 21:
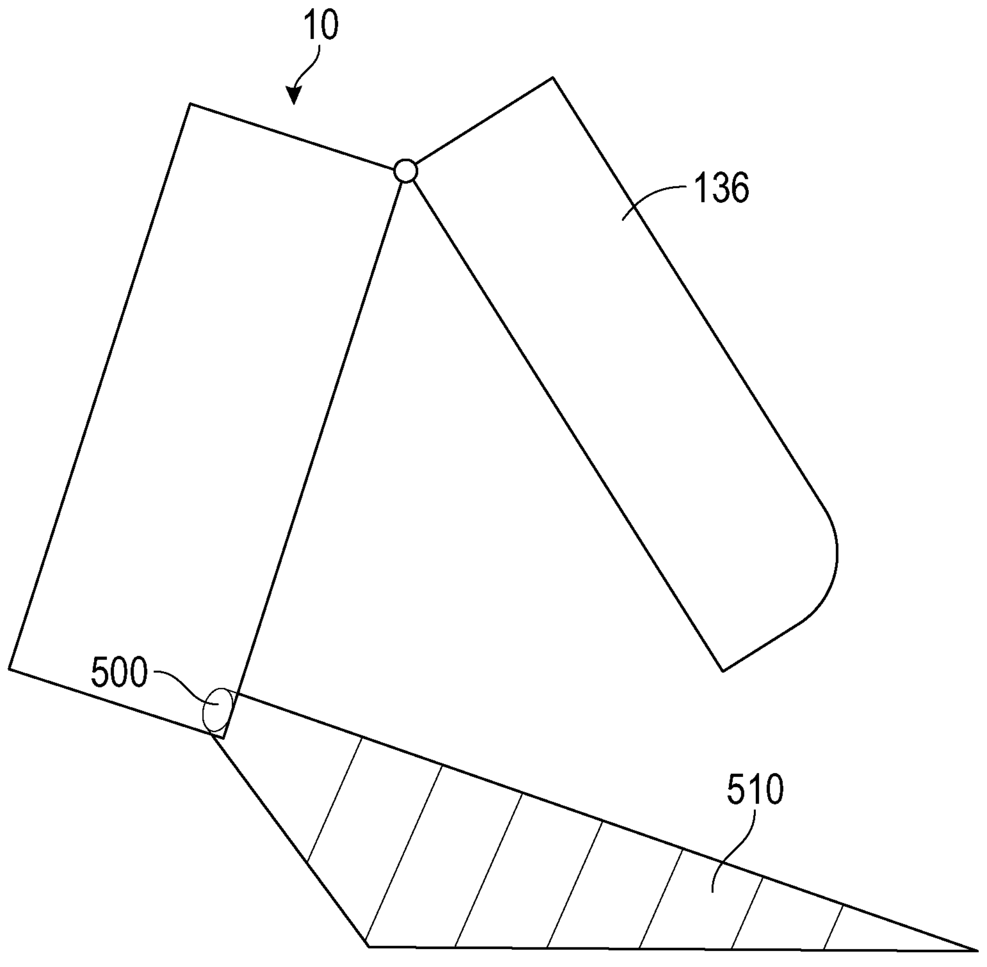
FIG. 21 is another view of a lighting pattern that can be projected onto the ground surface adjacent the vehicle of FIG. 1 from a tailgate of the vehicle.

The operational area 510 can be used to depict a variety of different items that a person should advantageously avoid. For example, and as shown in FIG. 21, the operational area 510 is defined below and behind the vehicle 10. The operational area 510 corresponds with the area above which the tailgate 136 will move as it is being raised to empty the refuse from the vehicle. Accordingly, the operational area 510 visually indicates an area where an operator should avoid standing to avoid any unwanted contact with the tailgate 136. The projectors 500 can be positioned along a rear bumper or along the main body of the vehicle 10 and can adjust the lighting so that when the main body is raised, the target or operational area 510 remains constant.

Figure 22:
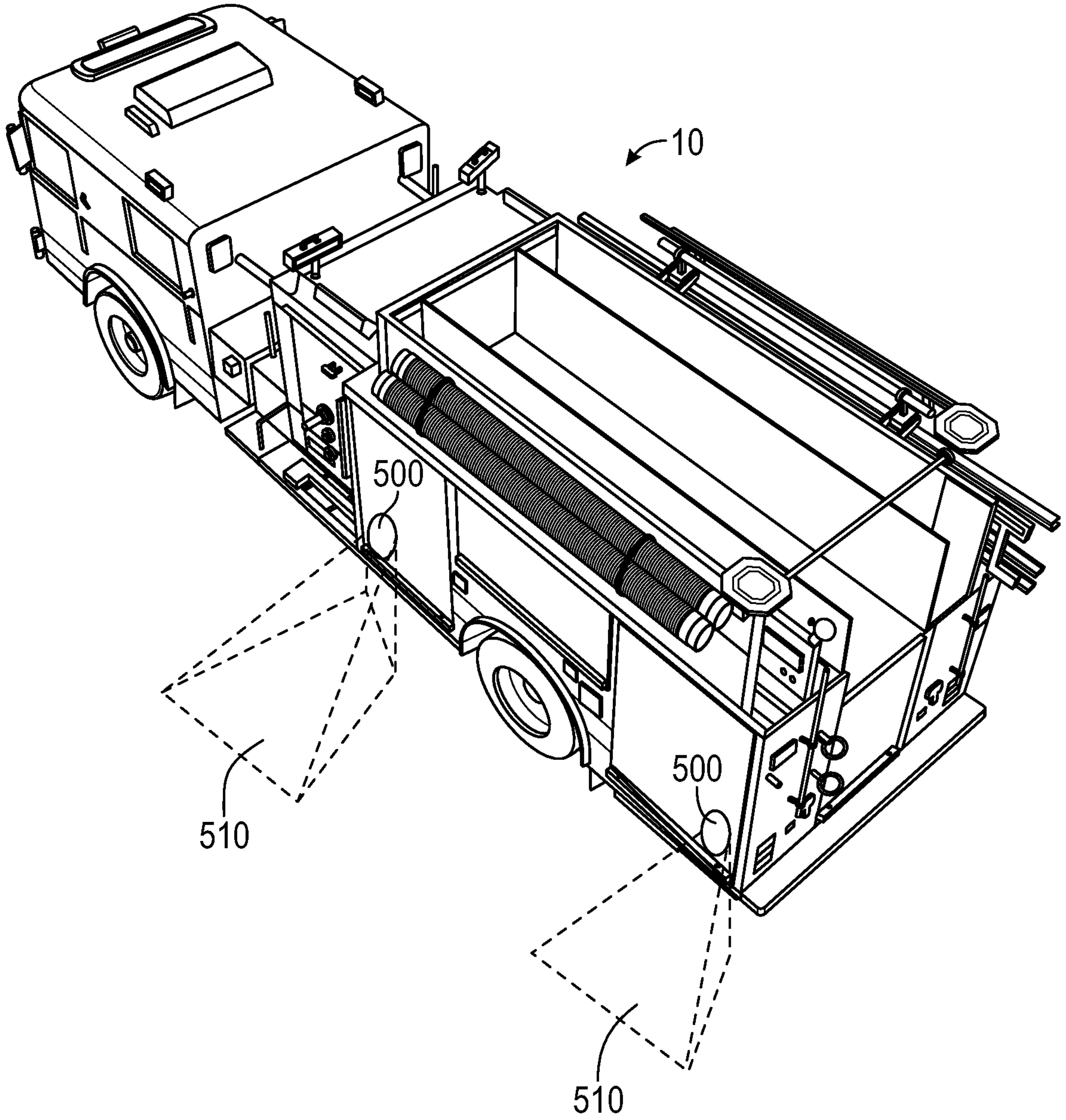
FIG. 22 is a top view of a lighting pattern that can be projected onto the ground surface adjacent the vehicle of FIG. 1 to depict a location of outriggers on the vehicle.
Figure 23:
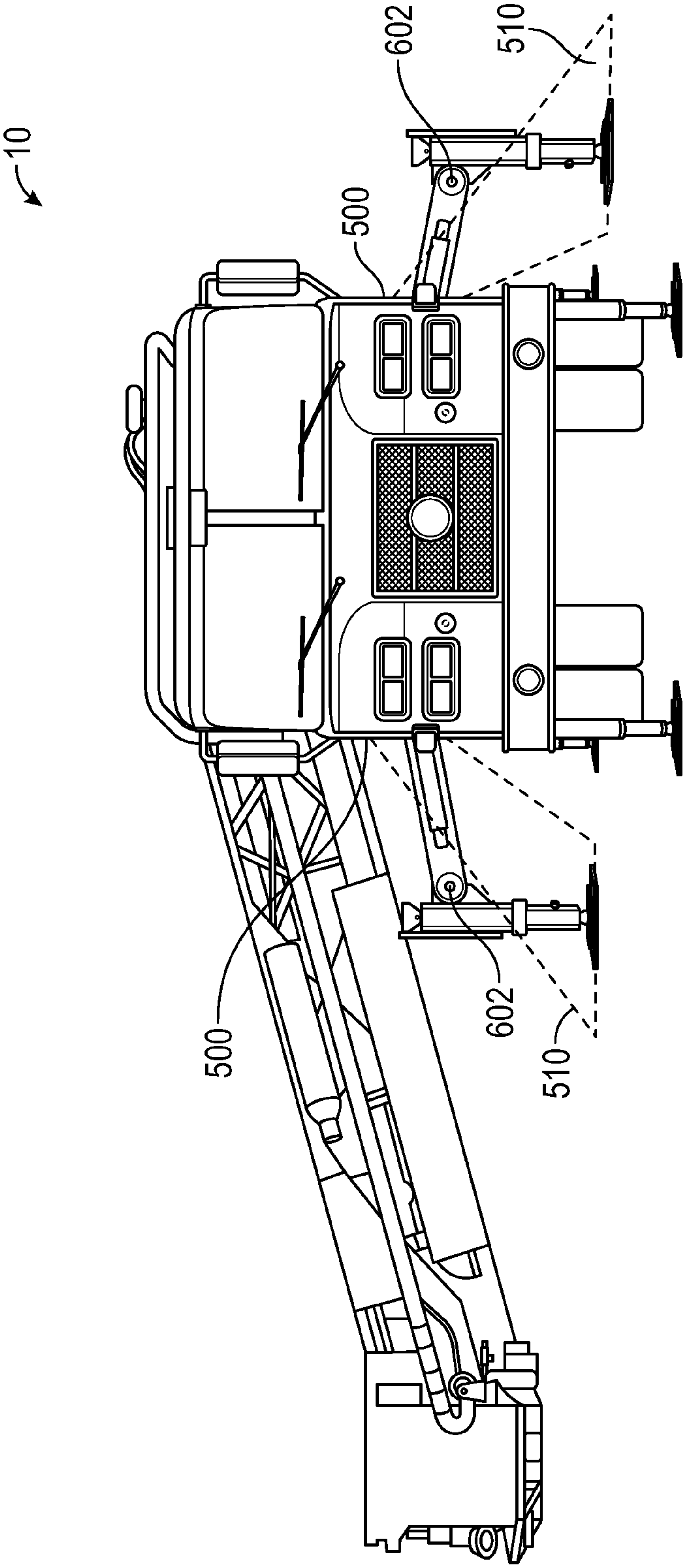
FIG. 23 is a front view of the vehicle of FIG. 1, depicting the lighting pattern of FIG. 22 projected onto the ground surface to illuminate outrigger locations.
Figure 24:
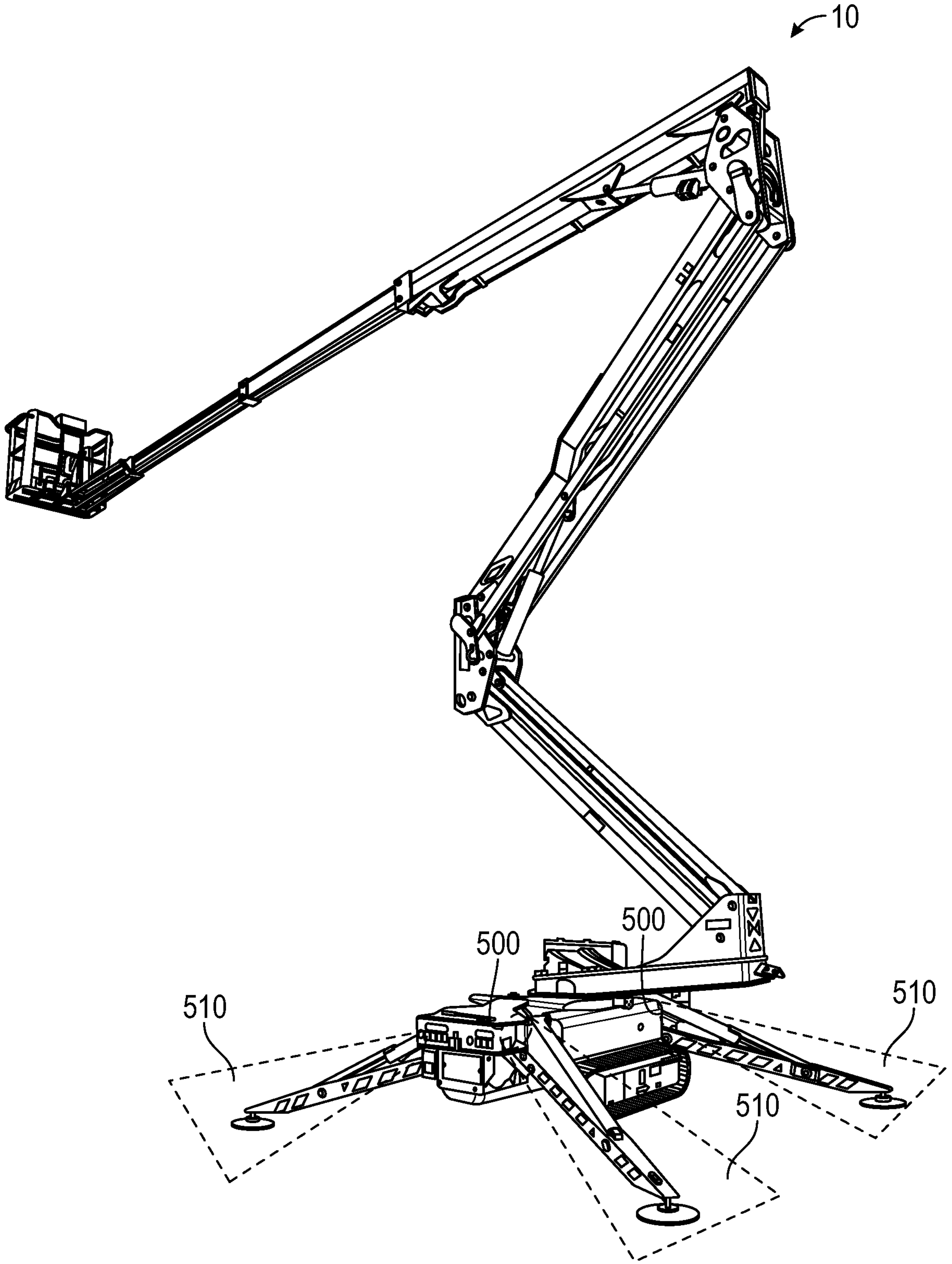
FIG. 24 is a perspective view of the vehicle of FIG. 1, shown as access equipment, projecting a lighting pattern onto the ground surface adjacent the vehicle to illuminate outrigger locations.

Various other alternatives can be used as well. For example, and as depicted in FIGS. 22-23, the projectors 500 can be used to illuminate an area where outriggers 602 on a firetruck will extend during operation. By indicating the locations where the outriggers 602 will extend with the operational area 510, an operator or person walking past the vehicle 10 will know to avoid the area, which can help to further prevent or reduce the occurrence of accidents. Likewise, an operator will be able to easily determine whether obstructions are positioned to contact or otherwise interfere with outriggers 602 before deploying the outriggers 602. In some examples, the target or operational area 510 can be illuminated even when the outriggers 602 are deployed. The operational area 510 can be illuminated at all times when the vehicle 10 is stopped. In other examples, and as depicted in FIG. 24, the projectors 500 can be used on the vehicle 10 when the vehicle 10 is arranged as access equipment. A projector 500 can be placed adjacent to each outrigger 602, such that a dedicated projector 500 is positioned along the vehicle 10 for each outrigger 602. In other examples, the projectors are positioned to illuminate an area surrounding the entire vehicle 10. The illuminated operational area 510 can serve as a warning and indicator so that people avoid approaching the vehicle 10, which can help promote safe operation of the vehicle 10.

Using the foregoing systems and methods described herein, refuse can be collected along routes in a much faster and more economical manner. Operators receive visual cues and certainty that a waste receptacle is within the area where the lifting system can properly engage the waste receptacle and complete refuse collection without having to leave the cab. The aggregate impact of achieving correct vehicle alignment relative to the waste receptacles being emptied is significant, given the high volume of stops typically performed on a given route. Substantial cost savings are realized by minimizing or eliminating failed attempts to engage waste receptacles with the lifting system due to improper alignment. Similarly, operators working outside of the vehicle are provided with visual information that allows successful engagement by the lifting system along each stop within a route. The reduction or elimination of error reduces the time spent along a collection route, decreases the costs of performing a collection route, and improves the safety of the workers by allowing the workers to stay within the vehicle in more scenarios. Safety is further promoted by providing a visual indication of an area to avoid by operators outside the vehicle.

As utilized herein, the terms “approximately,” “about,” “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled,” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

References herein to the positions of elements (e.g., “top,” “bottom,” “above,” “below”) are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A refuse vehicle comprising:
- a chassis;
- a tractive element coupled to the chassis and configured to engage a support surface to support the refuse vehicle;
- a refuse compartment coupled to the chassis;
- a lift assembly coupled to the chassis and configured to lift a refuse container to transfer refuse from the refuse container into the refuse compartment; and
- a light projector coupled to a movable portion of the lift assembly such that movement of the lift assembly moves the light projector relative to the chassis, the light projector positioned to emit a light onto the support surface to define a target area, wherein the target area represents a range of positions within which the lift assembly is capable of engaging the refuse container, and wherein the light projector is configured to adjust the light as the movable portion moves such that the target area remains constant on the support surface.

2. The refuse vehicle of claim 1, wherein the light from the light projector defines at least one boundary of the target area.

3. The refuse vehicle of claim 1, wherein the light from the light projector extends within the target area.

4. The refuse vehicle of claim 1, further comprising a sensor that detects a position of the refuse container relative to the target area and a first controller that varies a parameter of the light based on a sensor data.

5. The refuse vehicle of claim 4, wherein the parameter of the light is a wavelength of the light.

6. The refuse vehicle of claim 4, wherein the parameter of the light can be set at least to a first value, a second value, and a third value.

7. The refuse vehicle of claim 6, wherein the first controller is configured to set the parameter of the light to:
- the first value when the refuse container is positioned outside of the target area;
- the second value when the refuse container is partially within the target area; and
- the third value when the refuse container is within the target area.

8. The refuse vehicle of claim 7, further comprising a camera showing the target area, a display, and a second controller operatively coupled to the display and the camera and configured to display on the display an image data received from the camera with a visual indicator showing the target area.

9. The refuse vehicle of claim 1, wherein the refuse vehicle is a front-loading refuse vehicle, and the lift assembly includes a fork that engages the refuse container.

10. The refuse vehicle of claim 1, wherein the refuse vehicle is a side-loading refuse vehicle, and the lift assembly includes a grabber that engages the refuse container.

11. A refuse vehicle comprising:

a chassis;

a tractive element coupled to the chassis and configured to engage a support surface to support the refuse vehicle;

a refuse compartment coupled to the chassis;

a lift assembly coupled to the chassis and configured to lift a refuse container to transfer refuse from the refuse container into the refuse compartment, the lift assembly having a target area within which the lift assembly is capable of engaging the refuse container;

a light projector coupled to a movable portion of the lift assembly such that movement of the lift assembly moves the light projector relative to the chassis and positioned to emit a light onto the support surface to illuminate at least a portion of the target area, the light projector configured to adjust the light as the movable portion of the lift assembly moves such that the target area remains constant on the support surface;

a display;

a camera coupled to the chassis and configured to provide an image data representing at least a portion of the target area; and a controller operatively coupled to the display and the camera and configured to receive the image data from the camera and to display the image data and an overlay representing the target area on the display.

12. The refuse vehicle of claim 11, wherein the controller is configured to display the image data and the overlay representing the target area upon the refuse vehicle falling below a threshold speed.

13. The refuse vehicle of claim 11, wherein a wavelength of the light is outside a visible spectrum.

14. The refuse vehicle of claim 13, wherein the camera is configured to detect the wavelength and the controller is configured to display the light onto the display such that an operator of the refuse vehicle can view the light.

15. A vehicle, comprising:

a chassis;

a tractive element coupled to the chassis and configured to engage a support surface to support the vehicle;

a body coupled to the chassis;

an implement coupled to the chassis;

an actuator coupled to the implement and configured to move the implement between an extended position and a retracted position, the implement extending farther from the body in the extended position than in the retracted position; and a light projector coupled to a movable portion of the implement such that movement of the implement moves the light projector relative to the chassis, the light projector positioned to emit a light onto the support surface to define an operational area corresponding to an operation envelope of the implement, wherein the light projector is configured to adjust the light as the implement moves between the extended position and the retracted position such that the operational area remains constant on the support surface.

16. The vehicle of claim 15, wherein the vehicle is a refuse vehicle and the implement is a tailgate pivotally coupled to the body and configured to be raised to empty refuse from the refuse vehicle, wherein the light projector is positioned on the tailgate, and wherein the operational area corresponds to an area above which the tailgate moves as the tailgate is raised and visually indicates an area where an operator should avoid standing.

17. The vehicle of claim 15, wherein the vehicle is at least one of a firetruck or a lift device, and the implement is an outrigger.

18. The vehicle of claim 15, wherein the light forms text on the support surface.

* * * * *